United States Patent
Fang et al.

(10) Patent No.: US 11,579,495 B2
(45) Date of Patent: Feb. 14, 2023

(54) ARRAY SUBSTRATE, DISPLAY PANEL AND DISPLAY APPARATUS

(71) Applicant: BOE Technology Group Co., Ltd., Beijing (CN)

(72) Inventors: Zheng Fang, Beijing (CN); Pengxia Liang, Beijing (CN); Meina Yu, Beijing (CN); Ge Shi, Beijing (CN); Song Yang, Beijing (CN); Yujie Liu, Beijing (CN); Jiahui Han, Beijing (CN); Yanliu Sun, Beijing (CN); Hyunsic Choi, Beijing (CN); Hongpeng Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/584,236

(22) Filed: Jan. 25, 2022

(65) Prior Publication Data
US 2022/0236601 A1 Jul. 28, 2022

(30) Foreign Application Priority Data
Jan. 27, 2021 (CN) .......................... 202110112687.8

(51) Int. Cl.
*G02F 1/1343* (2006.01)
*G02F 1/1368* (2006.01)

(52) U.S. Cl.
CPC .... *G02F 1/13439* (2013.01); *G02F 1/134309* (2013.01); *G02F 1/1368* (2013.01)

(58) Field of Classification Search
CPC ................. G02F 1/1333; G02F 1/1343; G02F 1/134309; G02F 1/13439; G02F 1/134363; G02F 1/1362; G02F 1/136227; G02F 1/136286; G02F 1/1368
See application file for complete search history.

(56) References Cited

U.S. PATENT DOCUMENTS

| | | | | |
|---|---|---|---|---|
| 2012/0140153 A1* | 6/2012 | Kawashima | ...... | G02F 1/133707 349/96 |
| 2014/0111753 A1* | 4/2014 | Kobayashi | ........ | G02F 1/133707 349/123 |
| 2018/0157128 A1* | 6/2018 | Yao | ................... | G02F 1/134309 |

* cited by examiner

*Primary Examiner* — Thoi V Duong
(74) *Attorney, Agent, or Firm* — IPro, PLLC

(57) ABSTRACT

An array substrate is provided. One of a first electrode layer and a second electrode layer in the array substrate includes at least one slit electrode. The slit electrode is disposed between two adjacent data leads in the array substrate, and includes an electrode connecting portion and a plurality of first strip-shaped sub-electrodes. The electrode connecting portion includes a first connecting section parallel to and adjacent to the data lead, and a distance between two adjacent first strip-shaped sub-electrodes in a direction parallel to an extending direction of the first connecting section gradually increases along a direction going away from the first connecting section.

17 Claims, 18 Drawing Sheets

ARRAY SUBSTRATE, DISPLAY PANEL AND DISPLAY APPARATUS

CROSS-REFERENCE TO RELATED APPLICATION

This application claims priority to Chinese Patent Application No. 202110112687.8, filed on Jan. 27, 2021 and entitled "ARRAY SUBSTRATE AND DISPLAY PANEL", the entire content of which is incorporated herein by reference.

TECHNICAL FIELD

The present disclosure relates to the field of display technologies, and in particular to an array substrate, a display panel, and a display apparatus.

BACKGROUND

Liquid crystal in a liquid crystal display panel is generally horizontally arranged on a panel, and a fringe electric field is adopted to control the deflection direction of the liquid crystal. However, compared with a liquid crystal display mode driven in vertical alignment, the liquid crystal display mode driven in horizontal alignment is affected by an alignment pre-tilt angle of the liquid crystal and the assembly accuracy of a polarizer, and thus has weakness in contrast.

In related art, in order to improve the contrast of the liquid crystal display panel, a vertical alignment liquid crystal display mode based on the drive of the fringe electric field is provided.

SUMMARY

The present disclosure provides an array substrate, a display panel and a display apparatus. The technical solutions are as follows.

In an aspect, an array substrate is provided. The array substrate includes a base substrate, a first electrode layer, an insulating dielectric layer, and a second electrode layer which are laminated in sequence; wherein the array substrate further includes a plurality of data leads; one of the first electrode layer and the second electrode layer includes at least one slit electrode;

the slit electrode is disposed between two adjacent data leads, and the slit electrode includes an electrode connecting portion and a plurality of first strip-shaped sub-electrodes arranged in sequence, one end of each of the first strip-shaped sub-electrodes being connected to the electrode connecting portion; and the electrode connecting portion includes a first connecting section parallel to and adjacent to the data lead, wherein the plurality of first strip-shaped sub-electrodes are disposed on a same side of the first connecting section; and a distance between two adjacent first strip-shaped sub-electrodes in a direction parallel to an extending direction of the first connecting section gradually increases along a direction going away from the first connecting section.

Optionally, the first connecting section includes a first end and a second end that are opposite;

in one slit electrode, the first strip-shaped sub-electrode extends from the first end towards a side close to the second end along the direction going away from the first connecting section; in two adjacent first strip-shaped sub-electrodes, an inclination angle of one of the first strip-shaped sub-electrodes close to the second end is smaller than an inclination angle of the other first strip-shaped sub-electrode close to the first end;

wherein the inclination angle of each of the first strip-shaped sub-electrodes refers to an angle between an extending direction of the first strip-shaped sub-electrode and the extending direction of the first connecting section, and the inclination angle of each of the first strip-shaped sub-electrodes is an acute angle.

Optionally, in two adjacent first strip-shaped sub-electrodes, the inclination angle of one of the first strip-shaped sub-electrodes close to the second end is smaller than the inclination angle of the other first strip-shaped sub-electrode close to the first end by 1° to 3°.

Optionally, in two adjacent first strip-shaped sub-electrodes, the inclination angle of one of the first strip-shaped sub-electrodes close to the second end is smaller than the inclination angle of the other first strip-shaped sub-electrode close to the first end by 1.5° to 2.5°.

Optionally, when the slit electrode includes 2M+1 first strip-shaped sub-electrodes arranged in sequence, the inclination angle of an $(M+1)^{th}$ first strip-shaped sub-electrode is 45°, M being a positive integer greater than or equal to 1.

Optionally, when the slit electrode includes 2M first strip-shaped sub-electrodes arranged in sequence, either the inclination angle of an $M^{th}$ first strip-shaped sub-electrode or the inclination angle of is 45°, M being a positive integer greater than or equal to 1.

Optionally, when the slit electrode includes 2M first strip-shaped sub-electrodes arranged in sequence, an average value of the inclination angle of an $M^{th}$ first strip-shaped sub-electrode and the inclination angle of an $(M+1)^{th}$ first strip-shaped sub-electrode is 45°, M being a positive integer greater than or equal to 1.

Optionally, the electrode connecting portion further includes a second connecting section, and a first end of the second connecting section is connected to the first end of the first connecting section;

wherein in one slit electrode, one ends of part of the plurality of first strip-shaped sub-electrodes are connected to the first connecting section, and one ends of the other first strip-shaped sub-electrodes are connected to the second connecting section.

Optionally, in one slit electrode, each of the first strip-shaped sub-electrodes has a first edge and a second edge which are opposite, and the first edge of the first strip-shaped sub-electrode is farther from a second end of the second connecting section than the second edge of the first strip-shaped sub-electrode is;

in one slit electrode, the first connecting section has a first edge and a second edge which are opposite to each other and are parallel to the extending direction of the first connecting section, and the second edge of the first connecting section is farther from the first strip-shaped sub-electrode than the first edge of the first connecting section is;

wherein in one slit electrode, a distance between first design reference points of any two adjacent first strip-shaped sub-electrodes is equal; and the first design reference point of the first strip-shaped sub-electrode is an intersection point of a first auxiliary design line of the first strip-shaped sub-electrode and an auxiliary design line of the first connecting section, wherein the first auxiliary design line of the first strip-shaped sub-electrode is a straight line on which an orthographic projection of the first edge of the first strip-shaped sub-electrode on the base substrate is located, and the auxiliary design line of the first connecting section is a straight line on which an orthographic projection of the first edge of the first connecting section on the base substrate is located.

Optionally, in one slit electrode, each of the first strip-shaped sub-electrodes has a first edge and a second edge which are opposite, and the first edge of the first strip-shaped sub-electrode is farther from a second end of the second connecting section than the second edge of the first strip-shaped sub-electrode is;

in one slit electrode, the first connecting section has a first edge and a second edge which are opposite to each other and are parallel to the extending direction of the first connecting section, and the second edge of the first connecting section is farther from the first strip-shaped sub-electrode than the first edge of the first connecting section;

wherein in one slit electrode, in the plurality of first strip-shaped sub-electrodes connected to the first connecting section, a distance between first design reference points of any two adjacent first strip-shaped sub-electrodes is equal, and in the plurality of first strip-shaped sub-electrodes connected to the second connecting section, a distance between the first design reference points of two adjacent first strip-shaped sub-electrodes decreases sequentially along a direction going away from the first end of the first connecting section; and the first design reference point of the first strip-shaped sub-electrode is an intersection point of a first auxiliary design line of the first strip-shaped sub-electrode and an auxiliary design line of the first connecting section, the first auxiliary design line of the first strip-shaped sub-electrode is a straight line on which an orthographic projection of the first edge of the first strip-shaped sub-electrode on the base substrate is located, and the auxiliary design line of the first connecting section is a straight line on which an orthographic projection of the first edge of the first connecting section on the base substrate is located.

Optionally, the slit electrode further includes a plurality of second strip-shaped sub-electrodes arranged in sequence; one end of each of the second strip-shaped sub-electrodes is connected to the electrode connecting portion; the second strip-shaped sub-electrode extends from the second end of the first connecting section towards a side close to the first end of the first connecting section in the direction going away from the first connecting section;

in one slit electrode, the plurality of first strip-shaped sub-electrodes and the plurality of second strip-shaped sub-electrodes are disposed on a same side of the first connecting section; in two adjacent second strip-shaped sub-electrodes, an inclination angle of one of the second strip-shaped sub-electrodes close to the first end of the first connecting section is smaller than an inclination angle of the other second strip-shaped sub-electrode close to the second end of the first connecting section;

wherein the inclination angle of each of the second strip-shaped sub-electrodes refers to an angle between an extending direction of the second strip-shaped sub-electrode and the extending direction of the first connecting section, and the inclination angle of each of the second strip-shaped sub-electrodes is an acute angle.

Optionally, in two adjacent second strip-shaped sub-electrodes, the inclination angle of one of the second strip-shaped sub-electrodes close to the first end of the first connecting section is smaller than the inclination angle of the other second strip-shaped sub-electrode close to the second end of the first connecting section by 1° to 3°.

Optionally, in two adjacent second strip-shaped sub-electrodes, the inclination angle of one of the second strip-shaped sub-electrodes close to the first end of the first connecting section is smaller than the inclination angle of the other second strip-shaped sub-electrode close to the second end of the first connecting section by 1.5° to 2.5°.

Optionally, the electrode connecting portion further includes a third connecting section, and a first end of the third connecting section is connected to the second end of the first connecting section; and in one slit electrode, one ends of part of the plurality of the second strip-shaped sub-electrodes are connected to the first connecting section, and one ends of the other second strip-shaped sub-electrodes are connected to the third connecting section.

Optionally, in one slit electrode, electrode space is formed by the first connecting section, the second connecting section and the third connecting section, and the plurality of first strip-shaped sub-electrodes and the plurality of second strip-shaped sub-electrodes are disposed in the electrode space.

Optionally, the slit electrode includes at least one strip-shaped sub-electrode group, and each strip-shaped sub-electrode group includes one first strip-shaped sub-electrode and one second strip-shaped sub-electrode which are correspondingly disposed; and in each strip-shaped sub-electrode group, an end of the first strip-shaped sub-electrode away from the first connecting section is connected to an end of the second strip-shaped sub-electrode away from the first connecting section.

Optionally, in one slit electrode, each strip-shaped sub-electrode group and the electrode connecting portion define enclosed space; and in the enclosed space, a number of the first strip-shaped sub-electrodes is the same as a number of the second strip-shaped sub-electrodes.

Optionally, the electrode connecting portion further includes a third connecting section, and a first end of the third connecting section is connected to the second end of the first connecting section; in one slit electrode, each of the first strip-shaped sub-electrodes has a first edge and a second edge which are opposite, and the first edge of the first strip-shaped sub-electrode is farther from a second end of the second connecting section than the second edge of the first strip-shaped sub-electrode is; each of the second strip-shaped sub-electrodes has a first edge and a second edge which are opposite, and the first edge of the second strip-shaped sub-electrode is farther from a second end of the third connecting section than the second edge of the second strip-shaped sub-electrode is;

wherein in one slit electrode, a number of the first strip-shaped sub-electrodes is the same as a number of the second strip-shaped sub-electrodes; first auxiliary design lines of the first strip-shaped sub-electrodes and first auxiliary design lines of the second strip-shaped sub-electrodes are disposed symmetrically;

the first auxiliary design line of the first strip-shaped sub-electrode is a straight line on which an orthographic projection of the first edge of the first strip-shaped sub-electrode on the base substrate is located; and the first auxiliary design line of the second strip-shaped sub-electrode is a straight line on which an orthographic projection of the first edge of the second strip-shaped sub-electrode on the base substrate is located.

In another aspect, a display panel is provided. The display panel includes a drive circuit and an array substrate, wherein the drive circuit is configured to provide a driving signal for the array substrate; and the array substrate includes a base substrate, a first electrode layer, an insulating dielectric layer, and a second electrode layer which are laminated in sequence; wherein the array substrate further includes a plurality of data leads; one of the first electrode layer and the second electrode layer includes at least one slit electrode;

the slit electrode is disposed between two adjacent data leads, and the slit electrode includes an electrode connecting portion and a plurality of first strip-shaped sub-electrodes arranged in sequence; one end of each of the first strip-shaped sub-electrodes is connected to the electrode connecting portion; and the electrode connecting portion includes a first connecting section parallel to and adjacent to the data lead; the plurality of first strip-shaped sub-electrodes are disposed on a same side of the first connecting section; and a distance between two adjacent first strip-shaped sub-electrodes in a direction parallel to an extending direction of the first connecting section gradually increases along a direction going away from the first connecting section.

In still another aspect, a display apparatus is provided. The display apparatus includes: a power supply component and a display panel; wherein the power supply component is configured to supply power to the display panel; and the display panel includes a drive circuit and an array substrate, the drive circuit being configured to provide a driving signal for the array substrate; and the array substrate including a base substrate, a first electrode layer, an insulating dielectric layer, and a second electrode layer which are laminated in sequence; wherein the array substrate further includes a plurality of data leads; one of the first electrode layer and the second electrode layer includes at least one slit electrode;

the slit electrode is disposed between two adjacent data leads, and the slit electrode includes an electrode connecting portion and a plurality of first strip-shaped sub-electrodes arranged in sequence; one end of each of the first strip-shaped sub-electrodes is connected to the electrode connecting portion; and the electrode connecting portion includes a first connecting section parallel to and adjacent to the data lead; the plurality of first strip-shaped sub-electrodes are disposed on a same side of the first connecting section; and a distance between two adjacent first strip-shaped sub-electrodes in a direction parallel to an extending direction of the first connecting section gradually increases along a direction going away from the first connecting section.

BRIEF DESCRIPTION OF THE DRAWINGS

The above and other features and advantages of the present disclosure will become more apparent by describing exemplary embodiments thereof in detail with reference to the accompanying drawings.

Figure 1:
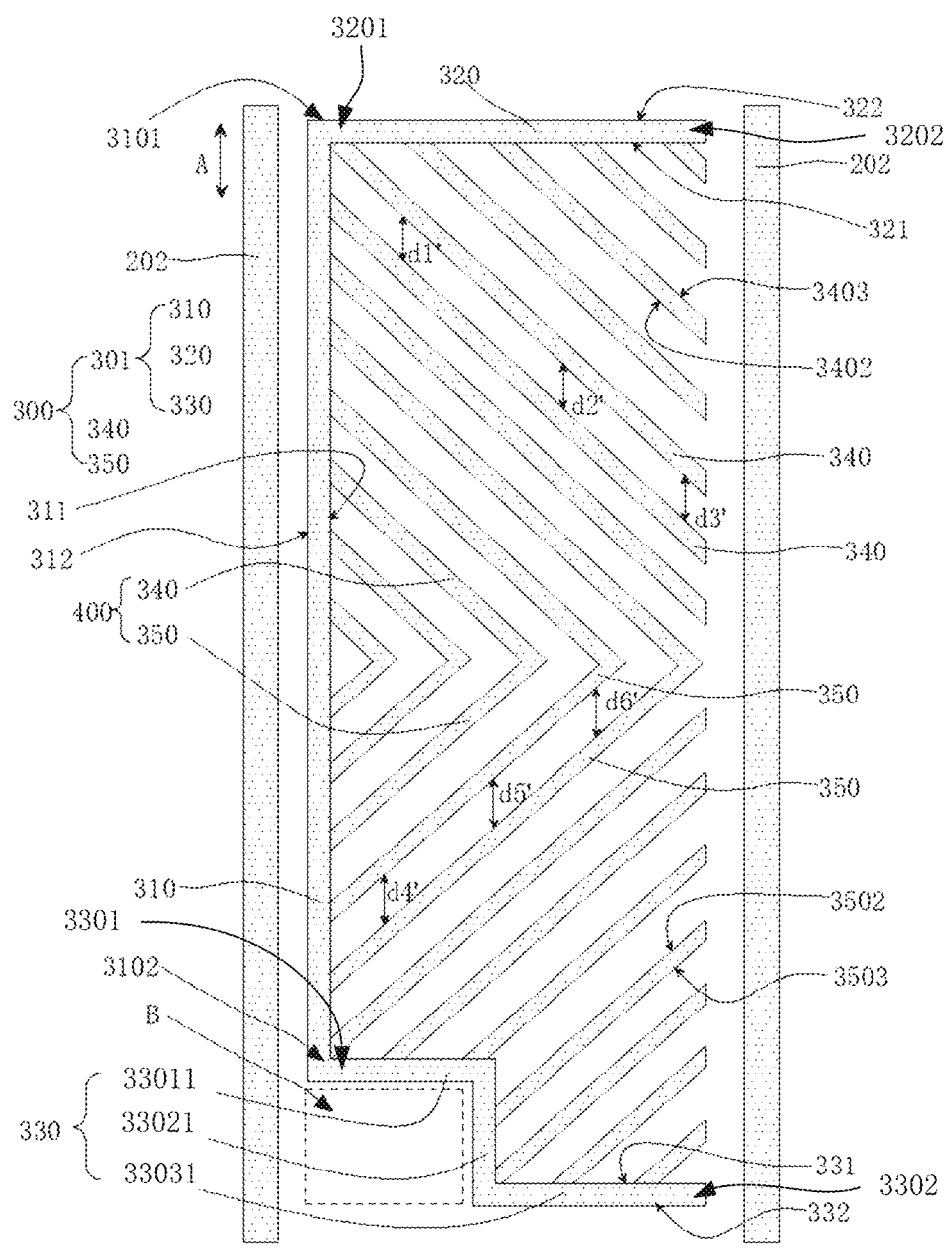
FIG. 1 is a schematic structural diagram of a slit electrode in the related art.

Reference signs of main elements in the figures and denotations thereof:

101—base substrate; 102—first electrode layer; 103—gate layer; 104—polysilicon semiconductor layer; 105—source/drain metal layer; 106—second electrode layer; 107—insulating dielectric layer; 1071—gate insulating layer; 1072—interlayer dielectric layer; 1073—passivation layer; 1081—first electrode; 1082—second electrode; 109—via electrode; 201—active layer of switching transistor; 202—data lead; 203—scan lead; 204—common connecting line; 300—slit electrode; 301—electrode connecting portion; 310—first connecting section; 3101—first end of first connecting section; 3102—second end of first connecting section; 311—first edge of first connecting section; 312—second edge of first connecting section; 313—auxiliary design line of first connecting section; 320—second connecting section; 3201—first end of second connecting section; 3202—second end of second connecting section; 321—first edge of second connecting section; 322—second edge of second connecting section; 323—auxiliary design line of second connecting section; 330—third connecting section; 3301—first end of third connecting section; 3302—second end of third connecting section; 331—first edge of third connecting section; 332—second edge of third connecting section; 333—auxiliary design line of third connecting section; 33011—first part of third connecting section; 33021—second part of third connecting section; 33031—third part of third connecting section; 340—first strip-shaped sub-electrode; 3401—axial line of first strip-shaped sub-electrode; 3402—first edge of first strip-shaped sub-electrode; 3403—second edge of first strip-shaped sub-electrode; 3404—first auxiliary design line of first strip-shaped sub-electrode; 3405—second auxiliary design line of first strip-shaped sub-electrode; 3406—first design reference point of first strip-shaped sub-electrode; 3407—second design reference point of first strip-shaped sub-electrode; 3408—third design reference point of first strip-shaped sub-electrode; 3409—fourth design reference point of first strip-shaped sub-electrode; 3410—fifth design reference point of first strip-shaped sub-electrode; 3411—first design reference size of first strip-shaped sub-electrode; 3412—second design reference size of first strip-shaped sub-electrode; 350—second strip-shaped sub-electrode; 3501—axial line of second strip-shaped sub-electrode; 3502—first edge of second strip-shaped sub-electrode; 3503—second edge of second strip-shaped sub-electrode; 3504—first auxiliary design line of second strip-shaped sub-electrode; 3505—second auxiliary design line of second strip-shaped sub-electrode; 3506—first design reference point of second strip-shaped sub-electrode; 3507—second design reference point of second strip-shaped sub-electrode; 3508—third design reference point of second strip-shaped sub-electrode; 3509—fourth design reference point of second strip-shaped sub-electrode; 3510—fifth design reference point of second strip-shaped sub-electrode; 3511—first design reference size of second strip-shaped sub-electrode; 3512—second design reference size of second strip-shaped sub-electrode; 360—virtual connecting line; 400—strip-shaped sub-electrode group; A—extending direction of first connecting section; B—avoiding gap; C—first line segment; D—second line segment; 01—array substrate; 02—drive circuit; 021—gate drive circuit; 022—source drive circuit; 001—display panel; 002—power supply component.

DETAILED DESCRIPTION

Exemplary embodiments are described more comprehensively with reference to the accompanying drawings. However, the exemplary embodiments can be implemented in various forms, and should not be understood as being limited to the examples set forth herein. On the contrary, these embodiments are provided to make the present disclosure more comprehensive and complete, and to fully convey the concept of the exemplary embodiments to those skilled in the art. The described features, structures or characteristics may be combined in one or more embodiments in any appropriate way. In the following descriptions, many specific details are provided to provide a sufficient understanding of the embodiments of the present disclosure.

In the figures, thicknesses of regions and layers may be exaggerated for clarity. The same reference signs in the figures denote the same or similar structures, and thus their detailed descriptions are omitted.

The described features, structures or characteristics may be combined in one or more embodiments in any appropriate way. In the following descriptions, many specific details are provided to give a sufficient understanding of the embodiments of the present disclosure. However, those skilled in the art will appreciate that the technical solutions of the present disclosure may be practiced without one or more of the specific details, or other methods, components, materials, and the like may be adopted. In other cases, well-known structures, materials, or operations are not shown or described in detail to avoid obscuring main technical ideas of the present disclosure.

When a certain structure is "on" the other structure, the certain structure may be integrally formed on the other structure, or the certain structure is "directly" disposed on the other structure, or the certain structure is "indirectly" disposed on the other structure through another structure.

The terms "a/an", "one", and "the" are used to indicate the presence of one or more elements/components/etc.; the terms "include", "comprise", and "have" are used to indicate open inclusion and mean that there may be other elements/components/etc., in addition to the listed elements/components/etc. The terms "first" and "second", etc., are only used as markers instead of a restriction on the number of objects.

In the related art, the liquid crystal display panel may include a first electrode layer, an insulating dielectric layer, a second electrode layer, and a liquid crystal layer which are sequentially laminated on one side of a base substrate. In any pixel region, one of the first electrode layer and the second electrode layer may be provided as a slit electrode, and the other may be provided as a plate electrode. A fringe electric field is generated between the slit electrode and the plate electrode, and the fringe electric field is configured to drive negative liquid crystal in the liquid crystal layer to fall, thereby controlling light emission of the liquid crystal display panel in the pixel region.

As shown in FIG. 1, in the related art, the slit electrode 300 may be of a double domain structure, that is, the slit electrode 300 includes first strip-shaped sub-electrodes 340 and second strip-shaped sub-electrodes 350. One side of the slit electrode 300 may be in an open state and the other side may be in a closed state. The distance between two adjacent first strip-shaped sub-electrodes 340 and the distance between two adjacent second strip-shaped sub-electrodes 350 are equal along an extending direction from the closed side to the open side. Exemplarily, in FIG. 1, the size d1', the size d2', and the size d3' are the same, and the size d4', the size d5', and the size d6' are the same.

Referring to FIG. 1, the liquid crystal display panel may further include data leads 202 located on both sides of the slit electrode 300. Due to voltages on the data lead 202, an electric field may be formed between the data lead and the slit electrode 300, thereby affecting the falling state of the liquid crystal in the liquid crystal layer. The electric fields formed by the data leads 202 on both sides of the slit electrode 300 cause the liquid crystal to fall in conflicting directions. Therefore, part of the liquid crystal in a central region of the slit electrode 300 does not fall and remains a vertical state. Such part of non-falling liquid crystal is not able to change the polarization state of incident polarized light, resulting in the formation of dark lines in this region, that is, the phenomenon of disclination.

Figure 2:
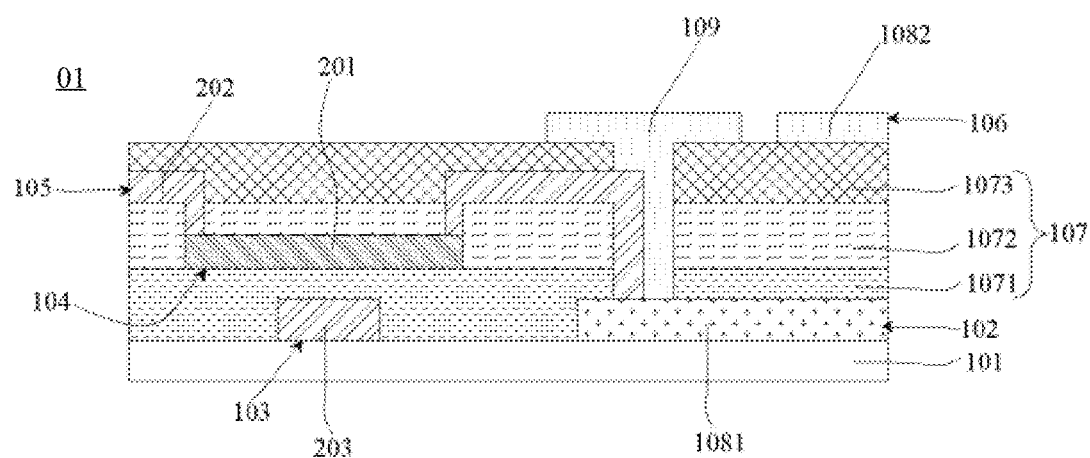
FIG. 2 is a schematic diagram of a laminated structure of an array substrate in an implementation of the present disclosure.
Figure 3:
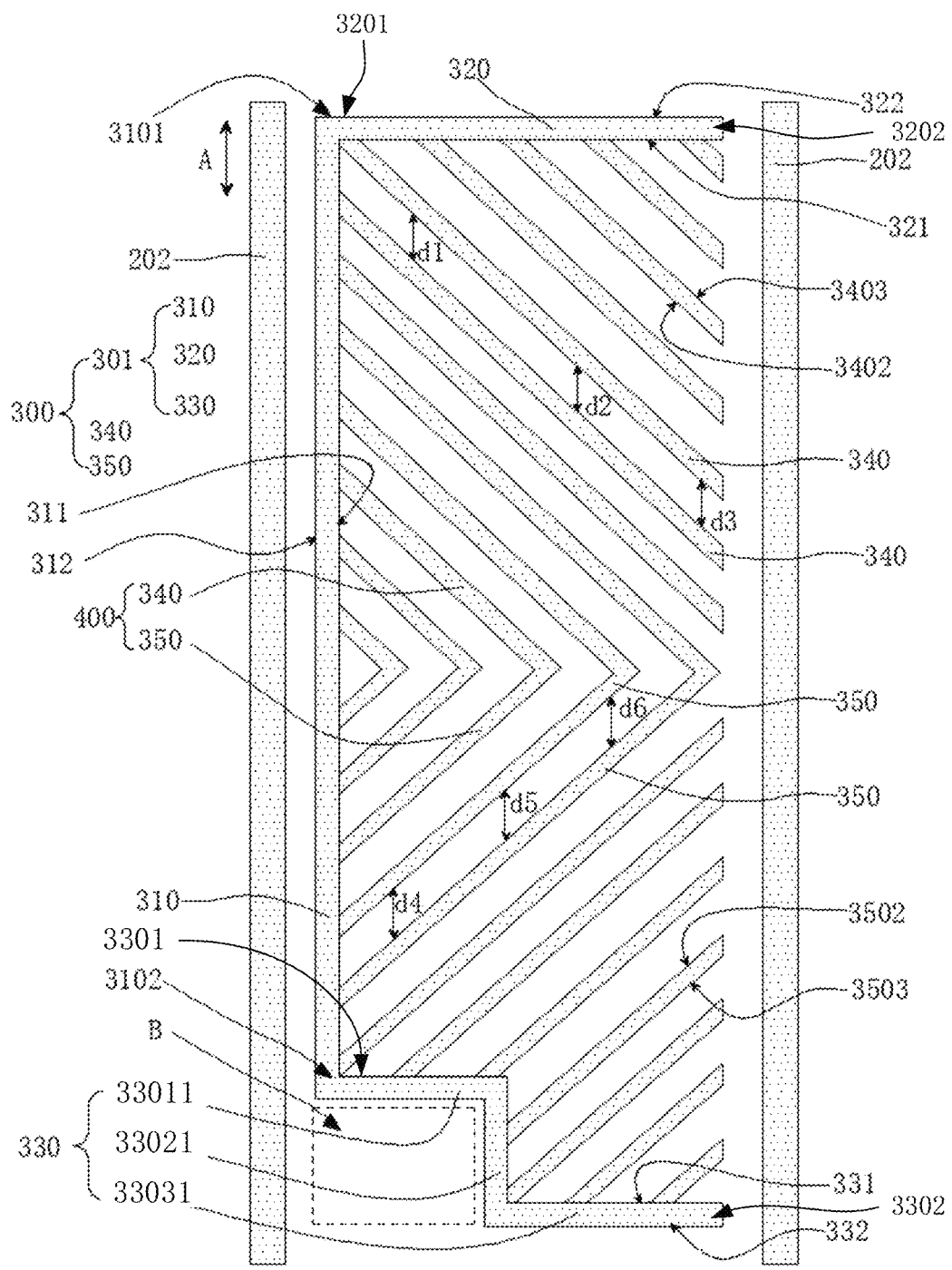
FIG. 3 is a schematic structural diagram of a slit electrode in an implementation of the present disclosure.

The present disclosure provides an array substrate. Referring to FIG. 2, the array substrate 01 includes a base substrate 101, a first electrode layer 102, an insulating dielectric layer 107, and a second electrode layer 106 which are laminated in sequence. Referring to FIG. 3, the array substrate further includes a plurality of data leads 202. One of the first electrode layer 102 and the second electrode layer 106 includes at least one slit electrode 300.

The slit electrode 300 is disposed between two adjacent data leads 202, and includes an electrode connecting portion 301 and a plurality of first strip-shaped sub-electrodes 340 arranged in sequence. One end of each first strip-shaped sub-electrode 340 is connected to the electrode connecting portion 301. The electrode connecting portion 301 includes a first connecting section 310 parallel to and adjacent to the data lead 202. The plurality of first strip-shaped sub-electrodes 340 are disposed on the same side of the first connecting section 310. The distance between two adjacent first strip-shaped sub-electrodes 340 in a direction parallel to the extending direction A of the first connecting section 310 gradually increases in a direction going away from the first connecting section 310.

In the array substrate according to the present disclosure, the data leads 202 are disposed on both sides of the slit electrode 300, an electric field is generated between the data lead 202 and the slit electrode 300, and the electric field can affect the inversion of liquid crystal molecules in the liquid crystal display panel.

The extending direction of the first connecting section 310 is parallel to the adjacent data lead 202, and the side of the slit electrode 300 close to the first connecting section 310 is in a closed state. Thus, the electric field between the side of the slit electrode 300 close to the first connecting section 310 and the data lead 202 has a high intensity. In addition, the side of the slit electrode 300 away from the first connecting section 310 is in an open state. Thus, the electric field between the side of the slit electrode 300 away from the first connecting section 310 and the data lead 202 has a low intensity.

Furthermore, in the array substrate according to the present disclosure, the distance between the first strip-shaped sub-electrodes 340 is larger on the side away from the first connecting section 310, which can further reduce the intensity of the electric field between the side of the slit electrode 300 away from the first connecting section 310 and the data lead 202. Therefore, in the present disclosure, the distance between the first strip-shaped sub-electrodes 340 gradually changes, so that the difference in the intensities of the electric fields between two sides of the slit electrode 300 and the data leads 202 increases, thereby reducing or eliminating disclination, and improving a light-emitting efficiency of the display panel adopting the array substrate.

Hereinafter, the structure, principle, and effect of the array substrate according to the present disclosure are further explained and described in combination with the accompanying drawings.

Figure 4:
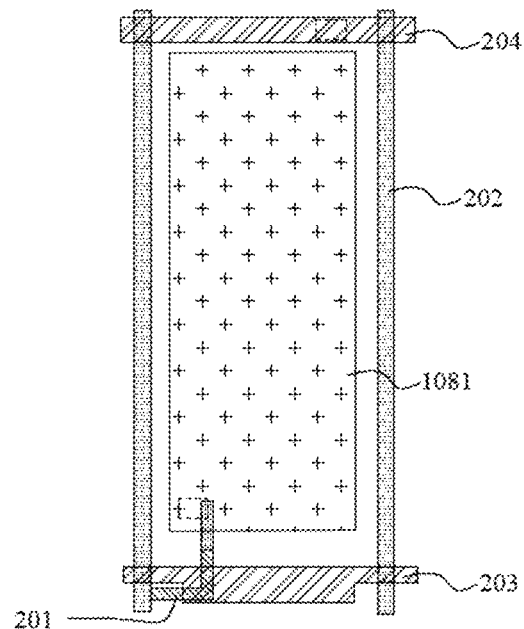
FIG. 4 is a laminated diagram of a first electrode layer, a gate layer, a source/drain metal layer, and a polysilicon semiconductor layer in an implementation of the present disclosure.
Figure 5:
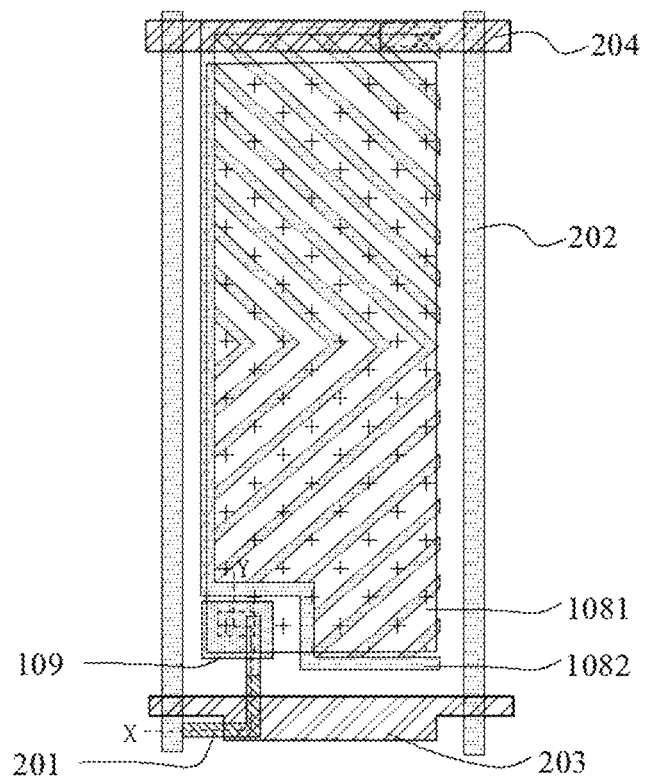
FIG. 5 is a laminated diagram of a first electrode layer, a gate layer, a source/drain metal layer, a polysilicon semiconductor layer, and a second electrode layer in an implementation of the present disclosure.

Referring to FIG. 2, FIG. 4 and FIG. 5, the array substrate includes the first electrode layer 102 and the second electrode layer 106. The first electrode layer 102 includes a first electrode 1081, and the second electrode layer 106 includes a second electrode 1082 corresponding to the first electrode 1081.

In the first electrode 1081 and the second electrode 1082 which are correspondingly disposed, an orthographic projection of the first electrode 1081 on the base substrate 101 and an orthographic projection of the second electrode 1082 on the base substrate 101 are at least partially overlapped. In terms of the shape of the electrodes, one of the first electrode 1081 and the second electrode 1082 is a slit electrode 300, and the other is a plate electrode. That is, one of the first electrode layer 102 and the second electrode layer 106 may include the slit electrode 300, and the other may include the plate electrode disposed corresponding to the slit electrode 300. In the slit electrode 300 and the plate electrode which are correspondingly disposed, the orthographic projection of the slit electrode 300 on the base substrate 101 and the orthographic projection of the plate electrode on the base substrate 101 are at least partially overlapped. In terms of the function of the electrodes, one of the first electrode 1081 and the second electrode 1082 may be a common electrode, and the other may be a pixel electrode. In other words, one of the first electrode layer 102 and the second electrode layer 106 may include the common electrode, and the other may include the pixel electrode.

Exemplarily, in an implementation of the present disclosure, referring to FIG. 2, FIG. 4, and FIG. 5, the first electrode 1081 in the first electrode layer 102 may be a plate electrode, and the first electrode 1081 may serve as a pixel electrode. The second electrode 1082 in the second electrode layer 106 may be the slit electrode 300, and the second electrode 1082 may serve as a common electrode.

Optionally, in the array substrate according to the present disclosure, the first electrode layer 102 and the second electrode layer 106 may be made of a transparent conductive material, for example, transparent metal oxide. Exemplarily, the material of the slit electrode 300 is indium tin oxide (ITO).

Referring to FIG. 3, the array substrate according to the present disclosure includes a plurality of data leads 202, and the plurality of data leads 202 may be disposed in parallel with each other. The data lead 202 as a whole may extend in a pixel column direction of the array substrate. The data lead 202 may be a straight line, or a broken line reciprocally bent in the pixel column direction and pixel row direction of the array substrate.

If the data lead 202 is a broken line, the data lead 202 may include a plurality of lead segments extending in different directions. The first connecting section 310 of the slit electrode 300 is disposed adjacent to one of the lead segments, and the extending direction of the first connecting section 310 is parallel to an extending direction of the lead segment adjacent to the first connecting section 310.

Exemplarily, in an implementation of the present disclosure, referring to FIG. 3, the data lead 202 is a straight line and extends in the pixel column direction. The first connecting section 310 of the slit electrode 300 also extends in the pixel column direction so as to be parallel to the extending direction of the data lead 202. In addition, in the pixel row direction, one data lead 202 is provided on both sides of the slit electrode 300.

Referring to FIG. 4 and FIG. 5, the array substrate according to the present disclosure includes a plurality of scan leads 203 and a switching transistor connected to the pixel electrode. One terminal of the switching transistor is connected to the data lead 202, the other terminal of the switching transistor is connected to the pixel electrode, and a gate of the switching transistor is connected to the scan lead 203. Under the control of a scan voltage loaded on the scan lead 203, the switching transistor may be turned on, so that the data voltage on the data lead 202 is loaded to the pixel electrode.

Optionally, referring to FIG. 4 and FIG. 5, the scan lead 203 may extend in the pixel row direction. The first electrode 1081 and the second electrode 1082 may be disposed between two adjacent scan leads 203.

Optionally, referring to FIG. 2, FIG. 4, and FIG. 5, the scan lead 203 may be reused as the gate of the switching transistor. An active layer 201 of the switching transistor may include a source contact region, a channel region, and a drain contact region which are sequentially connected. The source contact region is connected to the data lead 202 through a via hole, the drain contact region is connected to the pixel electrode through a via hole, and the scan lead 203 and the channel region of the switching transistor are overlapped, so that the overlapped part between the scan lead 203 and the channel region of the switching transistor may serve as the gate of the switching transistor.

Optionally, a material of the active layer 201 of the switching transistor may be an amorphous silicon semiconductor material, a polysilicon semiconductor material, a metal oxide semiconductor material, or an organic semiconductor material. Exemplarily, in an implementation of the present disclosure, the material of the active layer 201 of the switching transistor may be a low-temperature polysilicon semiconductor material. The source contact region and the drain contact region may be ion-doped to have high conductivity, and the channel region may remain semiconductor features to be turned on or turned off in response to a scan signal loaded on the gate.

Optionally, referring to FIG. 4 and FIG. 5, the array substrate according to the present disclosure may further include a plurality of common connecting lines 204, and the common connecting line 204 extends in the pixel row direction and is connected to various common electrodes disposed in the same row. In other words, the common electrodes disposed in the same row are connected to the same common connecting line 204.

Furthermore, the common connecting line 204 and the scan lead 203 may be disposed on the same film layer. That is, the common connecting line 204 and the scan lead 203 are made of the same material, and are prepared in the same preparation process. In this way, the array substrate may be provided with a gate layer 103, and the gate layer 103 is provided with the common connecting lines 204 and the scan leads 203 which are alternately disposed. In the pixel electrode and common electrode which are correspondingly disposed, the common electrode is connected to the common connecting line 204 through a via hole, and the gate of the switching transistor connected to the pixel electrode is connected to the scan lead 203.

Hereinafter, a film layer structure of the array substrate and the pattern of each film layer are exemplarily introduced in order to further illustrate and describe the structure and principle of the array substrate according to the present disclosure. It can be understood that the exemplary array substrate is only a specific implementation example of the array substrate according to the present disclosure, rather than a specific limitation to the structure of the array substrate according to the present disclosure.

Referring to FIG. 2, FIG. 4 and FIG. 5, the exemplary array substrate includes a base substrate 101, a first electrode layer 102, a gate layer 103, a gate insulating layer 1071, a polysilicon semiconductor layer 104, an interlayer dielectric layer 1072, a source/drain metal layer 105, a passivation layer 1073, and a second electrode layer 106 which are laminated in sequence.

In this exemplary array substrate, the base substrate 101 may be a transparent substrate, and may be made of glass, acrylic or the like.

In this exemplary array substrate, the first electrode layer 102 is made of transparent metal oxide, for example ITO. The first electrode layer 102 may be provided with first electrodes 1081 distributed in an array. The first electrodes 1081 are plate electrodes and serve as pixel electrodes. The first electrodes 1081 distributed in an array are arranged in a plurality of first electrode rows and a plurality of first electrode columns. The first electrode row includes a plurality of first electrodes 1081 arranged in the pixel row direction, and the first electrode column includes a plurality of first electrodes 1081 arranged in the pixel column direction.

In this exemplary array substrate, the gate layer 103 includes a plurality of scan leads 203 and a plurality of common connecting lines 204, and the plurality of scan leads 203 and the plurality of common connecting lines 204 extend in the pixel row direction and are alternately disposed. The plurality of scan leads 203 and the plurality of common connecting lines 204 are divided into a plurality of lead groups, and each lead group includes one scan lead 203 and one common connecting line 204 which are adjacent. Each lead group is disposed in correspondence to one first electrode row. In the lead group and the first electrode row which are correspondingly disposed, the scan lead 203 and the common connecting line 204 are respectively disposed on two sides of the first electrode row. In this way, one scan lead 203 and one common connecting line 204 are disposed between two adjacent first electrode rows; and one first electrode row is disposed between the scan lead 203 and the common connecting line 204 which are adjacent to each other. Optionally, the scan lead 203 in the lead group corresponding to a current first electrode row and the common connecting line 204 in the lead group corresponding to the next first electrode row are disposed between two adjacent first electrode rows.

During preparation, the first electrode layer 102 may be prepared at first and then the gate layer 103 is prepared, or the gate layer 103 may be prepared at first and then the first electrode layer 102 is prepared. In terms of the film layer relationship, the first electrode layer 102 may be disposed on the side of the gate layer 103 close to the base substrate 101, or on the side of the gate layer 103 away from the base substrate 101, or the first electrode layer 102 and the gate layer 103 may also be embedded with each other to be jointly clamped between the base substrate 101 and the gate insulating layer 1071.

In this exemplary array substrate, the polysilicon semiconductor layer 104 is disposed on the side of the gate insulating layer 1071 away from the base substrate 101, and the polysilicon semiconductor layer 104 may include a plurality of active layers 201 in one-to-tone correspondence to the plurality of first electrodes 1081.

The active layer includes a source contact region, a channel region, and a drain contact region which are sequentially connected. The channel region remains semiconductor features, and the source contact region and the drain contact region are ion-doped to have better conductivity. In the active layer and the scan lead 203 which correspond to the same first electrode 1081, an orthographic projection of the channel region of the active layer on the base substrate 101 is within an orthographic projection of the scan lead 203 on the base substrate 101. In this way, the source contact region of the active layer may form a source of the switching transistor corresponding to the first electrode 1081, the drain contact region of the active layer may form a drain of the switching transistor corresponding to the first electrode 1081, and the overlapped part between the scan lead 203 the channel region may be reused as a gate of the switching transistor corresponding to the first electrode 1081. In an implementation of the present disclosure, in the active layer and scan lead 203 which correspond to the same first electrode 1081, the source contact region is at least partially disposed on the side of the scan lead 203 away from the first electrode 1081, and the drain contact region is at least partially disposed on the side of the scan lead 203 close to the first electrode 1081.

In this exemplary array substrate, the source/drain metal layer 105 is disposed on the side of the interlayer dielectric layer 1072 away from the base substrate 101. The source/drain metal layer 105 may include a plurality of data leads 202 disposed in one-to-one correspondence to the plurality of first electrode columns, and a plurality of first connecting portions and a plurality of second connecting portions. The plurality of first connecting portions and the plurality of second connecting portions are disposed in one-to-one correspondence to the plurality of switching transistors. The data lead 202 extends in the pixel column direction and is disposed on the side of the first electrode column. One first electrode column is disposed between two adjacent data leads 202, and one data lead 202 is disposed between two adjacent first electrode columns. The first connecting portion is connected to the data lead 202, and is connected to the source contact region of the corresponding switching transistor through a via hole penetrating the interlayer dielectric layer 1072. The second connecting portion is connected to the drain contact region of the corresponding switching transistor through a via hole penetrating the interlayer dielectric layer 1072, and is connected to the first electrode 1081 of the corresponding switching transistor through a via hole penetrating the interlayer dielectric layer 1072 and the gate insulating layer 1071.

In an implementation, a gap is provided in the overlapped position between the scan lead 203 and the data lead 202, to reduce the overlapped area between the scan lead 203 and the data lead 202 and reduce the parasitic capacitance between the scan lead 203 and the data lead 202. Optionally, the gap is located on the side of the scan lead 203 away from the corresponding first electrode 1081.

In this exemplary array substrate, the second electrode layer 106 is disposed on the side of the passivation layer 1073 away from the base substrate 101. The second electrode layer 106 includes a plurality of second electrodes 1082 disposed in correspondence to the plurality of first electrodes 1081. The second electrode 1082 is the slit electrode 300 and functions as a common electrode. One row of second electrodes 1082 correspond to one common connecting line 204, and each second electrode 1082 and the corresponding common connecting line 204 are overlapped, and are connected through a via hole penetrating the passivation layer 1073, the interlayer dielectric layer 1072, and the gate insulating layer 1071.

The second electrode layer 106 further includes a via electrode 109. The via electrode 109 is connected to the second connecting portion of the source/drain metal layer 105 through a via hole penetrating the passivation layer 1073, and is connected to the first electrode 1081 through a via hole penetrating the passivation layer 1073, the interlayer dielectric layer 1072 and the gate insulating layer 1071, so that the drain of the switching transistor is connected to the first electrode 1081. Correspondingly, referring to FIG. 3 and FIG. 5, in order to dispose the via electrode 109, the second electrode 1082 may be provided with an avoiding gap B.

In this exemplary array substrate, the passivation layer 1073, the interlayer dielectric layer 1072, and the gate insulating layer 1071 may be made of a dielectric material such as silicon oxide, silicon nitride, or silicon oxynitride. Exemplarily, in an implementation of the present disclosure, the passivation layer 1073 and the interlayer dielectric layer 1072 are made of silicon nitride, and the gate insulating layer 1071 is made of silicon oxide. Parts, located between the first electrode 1081 and the second electrode 1082, of the passivation layer 1073, of the interlayer dielectric layer 1072, and of the gate insulating layer 1071 may serve as the insulating dielectric layer 107 in the present disclosure. It is to be understood that the part, between the first electrode 1081 and the second electrode 1082, of one or more of the passivation layer 1073, the interlayer dielectric layer 1072, and the gate insulating layer 1071 may also be removed or thinned to adjust the thickness of the insulating dielectric layer 107.

In the array substrate according to the present disclosure, referring to FIG. 3, the slit electrode 300 includes an electrode connecting portion 301 and a plurality of first strip-shaped sub-electrodes 340, and one end of each first strip-shaped sub-electrode 340 is connected to the electrode connecting portion 301. Referring to FIG. 3, the electrode connecting portion 301 includes a first connecting section 310 parallel to and adjacent to the data lead 202. The plurality of first strip-shaped sub-electrodes 340 are disposed on the same side of the first connecting section 310.

In an implementation, the width of the first strip-shaped sub-electrode 340 or the extending direction of the first strip-shaped sub-electrode 340 may be adjusted, so that the distance between the first strip-shaped sub-electrodes 340 gradually increases in the direction going away from the first connecting section 310. Certainly, the width and the extending direction of the first strip-shaped sub-electrode 340 may also be adjusted at the same time, so as to satisfy that the distance between two adjacent first strip-shaped sub-electrodes 340 in a direction parallel to the extending direction A of the first connecting section 310 gradually increases in the direction going away from the first connecting section 310.

In other words, referring to FIG. 3, the slit electrode 300 has a closed side close to the first connecting section 310, and an open side away from the first connecting section 310. In a direction from the closed side to the open side, the distance between two adjacent first strip-shaped sub-electrodes 340 gradually increases. Exemplarily, referring to FIG. 3, the size d1, the size d2, and the size d3 increase sequentially, that is, d3>d2>d1.

Optionally, referring to FIG. 3, in the array substrate according to the present disclosure, the first connecting section 310 includes a first end 3101 and a second end 3102 which are opposite. In one slit electrode 300, the first strip-shaped sub-electrode 340 extends from the first end 3101 towards the side close to the second end 3102 in the direction going away from the first connecting section 310.

Optionally, referring to FIG. 3, the electrode connecting portion 301 further includes a second connecting section 320, and the first end 3201 of the second connecting section 320 is connected to the first end 3101 of the first connecting section 310. In one slit electrode 300, one ends of part of the plurality of first strip-shaped sub-electrodes 340 are connected to the first connecting section 310, and one ends of the other first strip-shaped sub-electrodes 340 are connected to the second connecting section 320.

Optionally, referring to FIG. 3, the slit electrode 300 may further include a plurality of second strip-shaped sub-electrodes 350 arranged in sequence. One end of each second strip-shaped sub-electrode 350 is connected to the electrode connecting portion 301. The second strip-shaped sub-electrode 350 extends from the second end 3102 towards the side close to the first end 3101 in the direction going away from the first connecting section 310. In one slit electrode 300, the plurality of first strip-shaped sub-electrodes 340 and the plurality of second strip-shaped sub-electrodes 350 are disposed on the same side of the first connecting section 310.

The distance between two adjacent second strip-shaped sub-electrodes 350 in a direction parallel to the extending direction A of the first connecting section 310 gradually increases in the direction going away from the first connecting section 310. Exemplarily, the size d4, the size d5, and the size d6 increase in sequence, that is, d6>d5>d4. In this way, the slit electrode 300 may be a slit electrode 300 with a double domain structure. The slit electrode 300 includes a first domain structure of the first strip-shaped sub-electrodes 340 and a second domain structure of the second strip-shaped sub-electrodes 350. Both the first domain structure and the second domain structure of the slit electrode 300 can eliminate or reduce the disclination, and improve the light extraction efficiency of the display panel adopting the array substrate.

Optionally, referring to FIG. 3, the electrode connecting portion 301 may further include a third connecting section 330. The first end 3301 of third connecting section 330 is connected to the second end 3102 of the first connecting section 310, and the third connecting section 330 and the second connecting section 320 are opposite. In one slit electrode 300, part of the plurality of second strip-shaped sub-electrodes 350 are connected to the first connecting section 310, and the other second strip-shaped sub-electrodes 350 are connected to the third connecting section 330.

Optionally, referring to FIG. 3, in one slit electrode 300, electrode space is formed by the first connecting section 310, the second connecting section 320 and the third connecting section 330 of the electrode connecting portion 301. The plurality of first strip-shaped sub-electrodes 340 and the plurality of second strip-shaped sub-electrodes 350 are disposed in the electrode space.

In some implementations of the present disclosure, referring to FIG. 3 and FIG. 6 to FIG. 11, the boundary of the electrode space may include the first connecting section 310, the second connecting section 320, the third connecting section 330, and a virtual connecting line 360 between the end of the second connecting section 320 away from the first connecting section 310 and the end of the third connecting section 330 away from the first connecting section 310.

Furthermore, referring to FIG. 3, the side of the electrode space away from the first connecting section 310 is not provided with a conductive structure connecting the first strip-shaped sub-electrodes 340 and the second strip-shaped sub-electrodes 350, so that the side of the electrode space away from the first connecting section 310 is open, thereby destroying uniformity of the electric field formed between the slit electrode 300 and the data lead, and reducing or eliminating the disclination.

Referring to FIG. 6 to FIG. 11, when the first strip-shaped sub-electrode 340 or the second strip-shaped sub-electrode 350 extends to the virtual connecting line 360, an orthographic projection of the edge, away from the first connecting section 310, of the first strip-shaped sub-electrode 340 or of the second strip-shaped sub-electrode 350 on the base substrate 101 is within an orthographic projection of the virtual connecting line 360 on the base substrate 101.

Optionally, referring to FIG. 3, the slit electrode 300 includes at least one strip-shaped sub-electrode group 400, and each strip-shaped sub-electrode group 400 includes one first strip-shaped sub-electrode 340 and one second strip-shaped sub-electrode 350 which are correspondingly disposed. In each strip-shaped sub-electrode group 400, the end of the first strip-shaped sub-electrode 340 away from the first connecting section 310 is connected to the end of the second strip-shaped sub-electrode 350 away from the first connecting section 310. As the first strip-shaped sub-electrode 340 and the second strip-shaped sub-electrode 350 extend in opposite directions, the first strip-shaped sub-electrode 340 and the second strip-shaped sub-electrode 350 do extend farther when they intersect. In other words, the first strip-shaped sub-electrode 340 and the second strip-shaped sub-electrode 350 which intersect form one strip-shaped sub-electrode group 400.

Optionally, referring to FIG. 3, each strip-shaped sub-electrode group 400 and the electrode connecting portion 301 define enclosed space. In the enclosed space, the first strip-shaped sub-electrode 340 and the second strip-shaped sub-electrode 350 may not be separately disposed, but the strip-shaped sub-electrode group 400 is disposed. In this way, in the enclosed space, the number of the first strip-shaped sub-electrodes 340 is the same as the number of the second strip-shaped sub-electrodes 350. In other words, in one slit electrode 300, the plurality of first strip-shaped sub-electrodes 340 may be numbered sequentially in the direction from the second end 3102 to the first end 3101 of the first connecting section 310, and the plurality of second strip-shaped sub-electrodes 350 may be numbered sequentially in the direction from the first end 3101 to the second end 3102 of the first connecting section 310. The first strip-shaped sub-electrode 340 numbered 1 and the second strip-shaped sub-electrode 350 numbered 1 may form a first strip-shaped sub-electrode group 400; the first strip-shaped sub-electrode 340 numbered 2 and the second strip-shaped sub-electrode 350 numbered 2 may form a second strip-shaped sub-electrode group 400; and so on, the first strip-shaped sub-electrode 340 numbered i and the second strip-shaped sub-electrode 350 numbered i may form an $i^{th}$ strip-shaped sub-electrode group 400, i being a positive integer, until that the first strip-shaped sub-electrode 340 numbered i+1, when extending to the side of the electrode space away from the first connecting section 310 (that is, the virtual connecting line 360), still cannot be connected to the second strip-shaped sub-electrode 350 numbered i+1.

In an implementation of the present disclosure, referring to FIG. 3, the slit electrode 300 may form an avoiding gap B, so that other conductive structures are disposed in the avoiding gap B. Exemplarily, referring to the exemplary array substrate according to the present disclosure, the slit electrode 300 is provided with the avoiding gap B so as to avoid the via electrode 109 connecting the first electrode 1081 and the drain of the switching transistor.

Optionally, the second connecting section 320 extends in the pixel row direction. The third connecting section 330 includes a first part 33011, a second part 33021, and a third part 33031 which are connected in sequence. The first part 33011 and the third part 33031 extend in the pixel row direction, and the second part 33021 extends in the extending direction of the first connecting section 310. The first part 33011 is connected to the first connecting section 310. In this way, the avoiding gap B is located on the side of the slit electrode 300 close to the second end 3102 of the first connecting section 310. It can be understood that the avoiding gap B may also be located on the side close to the first end 3101 of the first connecting section 310. Optionally, the avoiding gap B is located on a side close to the first connecting section 310, so that the side of the slit electrode 300 away from the first connecting section 310 remains open.

In the implementation of the present disclosure, referring to FIG. 3 and FIG. 6 to FIG. 11, each first strip-shaped sub-electrode 340 has a first edge 3402 and a second edge 3403 disposed opposite to each other, and the first edge 3402 is farther away from the second end 3202 of the second connecting section 320 than the second edge 3403.

The straight line on which an orthographic projection of the first edge 3402 of the first strip-shaped sub-electrode 340 on the base substrate 101 is located is a first auxiliary design line 3404 of the first strip-shaped sub-electrode 340. The straight line on which an orthographic projection of the second edge 3403 of the first strip-shaped sub-electrode 340 on the base substrate 101 is located is a second auxiliary design line 3405 of the first strip-shaped sub-electrode 340. The first strip-shaped sub-electrode 340 extends in the direction of an axial line 3401 thereof, and any point on the axial line 3401 of the first strip-shaped sub-electrode 340 is equidistant from the first auxiliary design line 3404 and the second auxiliary design line 3405 of the first strip-shaped sub-electrode 340. The angle between the extending direction of the first strip-shaped sub-electrode 340 and the extending direction of the first connecting section 310 is an inclination angle θ of the first strip-shaped sub-electrode 340, and the inclination angle is an acute angle.

Referring to FIG. 3, in one slit electrode 300, the first connecting section 310 has a first edge 311 and a second edge 312 which are opposite and parallel to the extending direction of the first connecting section 310. The second edge 312 is farther from the first strip-shaped sub-electrode 340 than the first edge 311 is. The straight line on which an orthographic projection of the first edge 311 of the first connecting section 310 on the base substrate 101 is located is an auxiliary design line 313 of the first connecting section 310.

Referring to FIG. 6, FIG. 7, FIG. 10 and FIG. 11, in one slit electrode 300, the intersection point of the first auxiliary design line 3404 of the first strip-shaped sub-electrode 340 and the auxiliary design line 313 of the first connecting section 310 is a first design reference point 3406 of the first strip-shaped sub-electrode 340. The intersection point of the second auxiliary design line 3405 of the first strip-shaped sub-electrode 340 and the auxiliary design line 313 of the first connecting section 310 is a second design reference point 3407 of the first strip-shaped sub-electrode 340. The distance between the first design reference point 3406 and the second design reference point 3407 of the first strip-shaped sub-electrode 340 is a first design reference size of the first strip-shaped sub-electrode 340.

Referring to FIG. 3, in one slit electrode 300, the second connecting section 320 has a first edge 321 and a second edge 322 which are opposite and connected to the first connecting section 310. The second edge 322 is farther from the first strip-shaped sub-electrode 340 than the first edge 321 is. The straight line on which an orthographic projection of the first edge 321 of the second connecting section 320 on the base substrate 101 is located is an auxiliary design line 323 of the second connecting section 320. The auxiliary design line 323 of the second connecting section 320 is parallel to the pixel row direction of the array substrate.

The intersection point of the first auxiliary design line 3404 of the first strip-shaped sub-electrode 340 and the auxiliary design line 323 of the second connecting section 320 is a third design reference point 3408 of the first strip-shaped sub-electrode 340. The intersection point of the second auxiliary design line 3405 of the first strip-shaped sub-electrode 340 and the auxiliary design line 323 of the second connecting section 320 is a fourth design reference point 3409 of the first strip-shaped sub-electrode 340. The distance between the third design reference point 3408 and the fourth design reference point 3409 of the first strip-shaped sub-electrode 340 is a second design reference size of the first strip-shaped sub-electrode 340.

Optionally, in the plurality of first strip-shaped sub-electrodes 340 arranged in sequence of one slit electrode 300, the inclination angle of the first strip-shaped sub-electrode 340 close to the middle may be 45° or approximate 45°, which facilitates the design and preparation of the slit electrode 300, and also facilitates the improvement of the light extraction efficiency of the display panel. Exemplarily, in an implementation of the present disclosure, if the slit electrode 300 includes 2M+1 first strip-shaped sub-electrodes 340 arranged in sequence, the inclination angle of the $(M+1)^{th}$ first strip-shaped sub-electrode 340 may be 45°. Exemplarily, in another implementation of the present disclosure, if the slit electrode 300 includes 2M first strip-shaped sub-electrodes 340 arranged in sequence, the inclination angle of either the $M^{th}$ first stripe-shaped sub-electrode 340 or the $(M+1)^{th}$ first stripe-shaped sub-electrode 340 is 45°. Exemplarily, in another implementation of the present disclosure, if the slit electrode 300 includes 2M first strip-shaped sub-electrodes 340 arranged in sequence, an average value of the inclination angles of the $M^{th}$ and $(M+1)^{th}$ first strip-shaped sub-electrodes 340 is 45°, wherein M is a positive integer greater than or equal to 1.

In some implementations, referring to FIG. 3, FIG. 6, FIG. 7 and FIG. 12, in two adjacent first strip-shaped sub-electrodes 340, the inclination angle of the first strip-shaped sub-electrode 340 close to the second end 3102 of the first connecting section 310 is smaller than the inclination angle of the first strip-shaped sub-electrode 340 close to the first end 3101. In this way, the first strip-shaped sub-electrodes 340 are disposed divergently in the direction going away from the first connecting section 310, so that the distance between the first strip-shaped sub-electrodes 340 gradually increases in the direction going away from the first connecting section 310.

Figure 12:
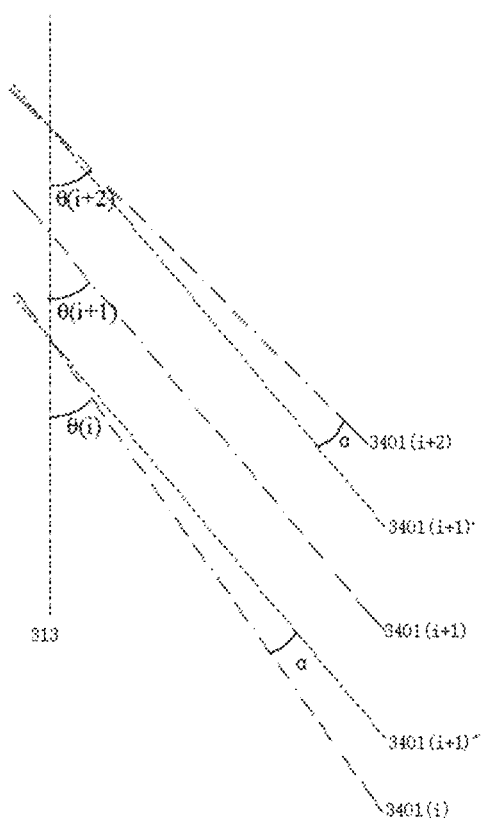
FIG. 12 is a schematic diagram of axial lines and inclination angles of three adjacent first strip-shaped sub-electrodes in an implementation of the present disclosure.

Exemplarily, in the direction from the second end 3102 to the first end 3101 of the first connecting section 310, the first strip-shaped sub-electrodes 340 are sequentially numbered from the serial number 1. FIG. 12 shows the axial lines 3401 of three adjacent first strip-shaped sub-electrodes 340, and the dashed line 3401(i+1)' and the dashed line 3401(i+1)"

are parallel to the axial line 3401(i+1). Referring to FIG. 12, the axial line 3401(i) is the axial line of the first stripe-shaped sub-electrode 340 numbered i, the axial line 3401(i+1) is the axial line of the first strip-shaped sub-electrode 340 numbered i+1, and the axial line 3401(i+2) is the axial line of the first strip-shaped sub-electrode 340 numbered i+2. The inclination angle θ(i) is the inclination angle of the first strip-shaped sub-electrode 340 numbered i, the inclination angle θ(i+1) is the inclination angle of the first strip-shaped sub-electrode 340 numbered i+1, and the inclination angle θ(i+2) is the inclination angle of the first strip-shaped sub-electrode 340 numbered i+2. The inclination angle θ(i), the inclination angle θ(i+1), the inclination angle θ(i+2) increase sequentially, that is, θ(i+2)>θ(i+1)>θ(i).

Figure 6:
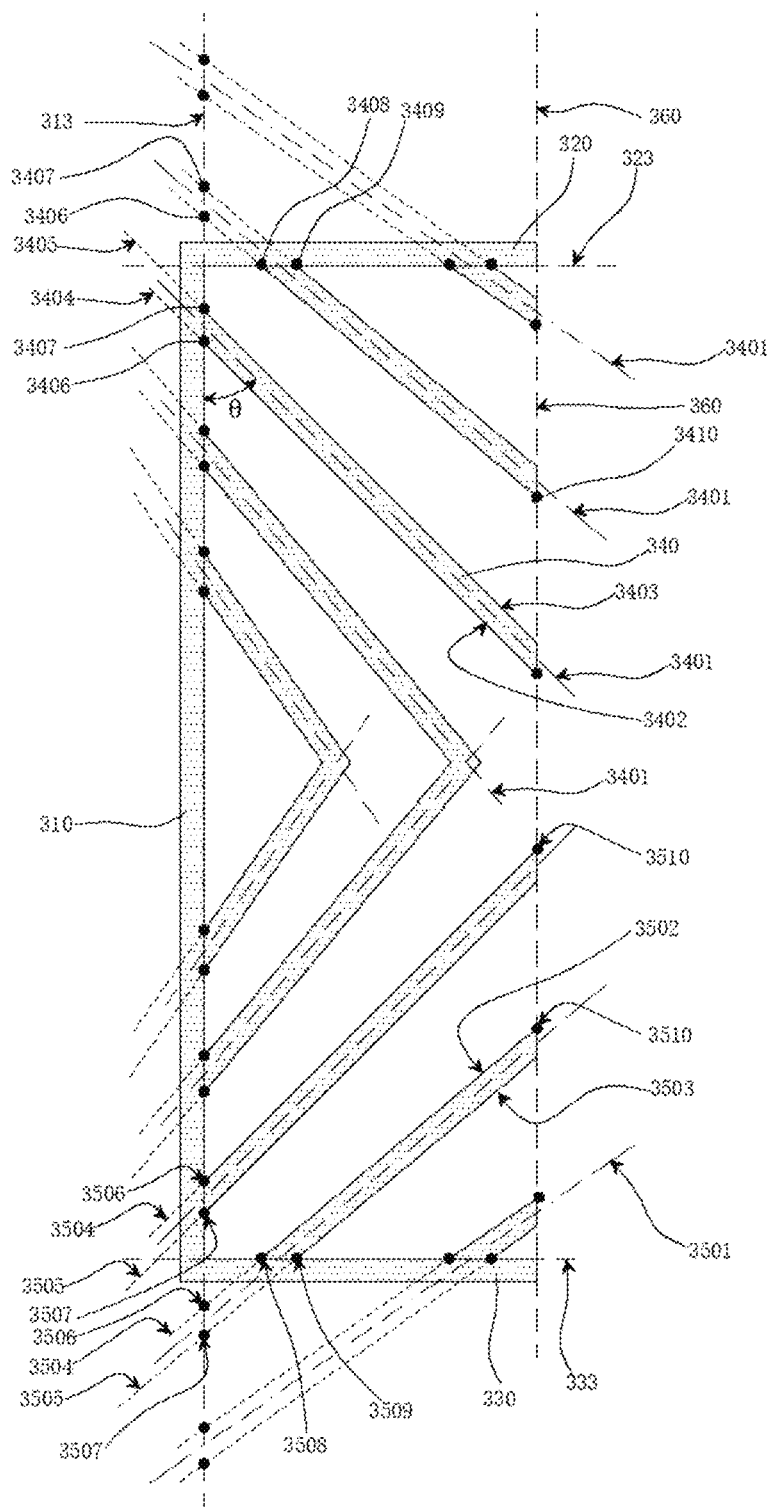
FIG. 6 is a schematic structural diagram of a slit electrode in an implementation of the present disclosure.
Figure 7:
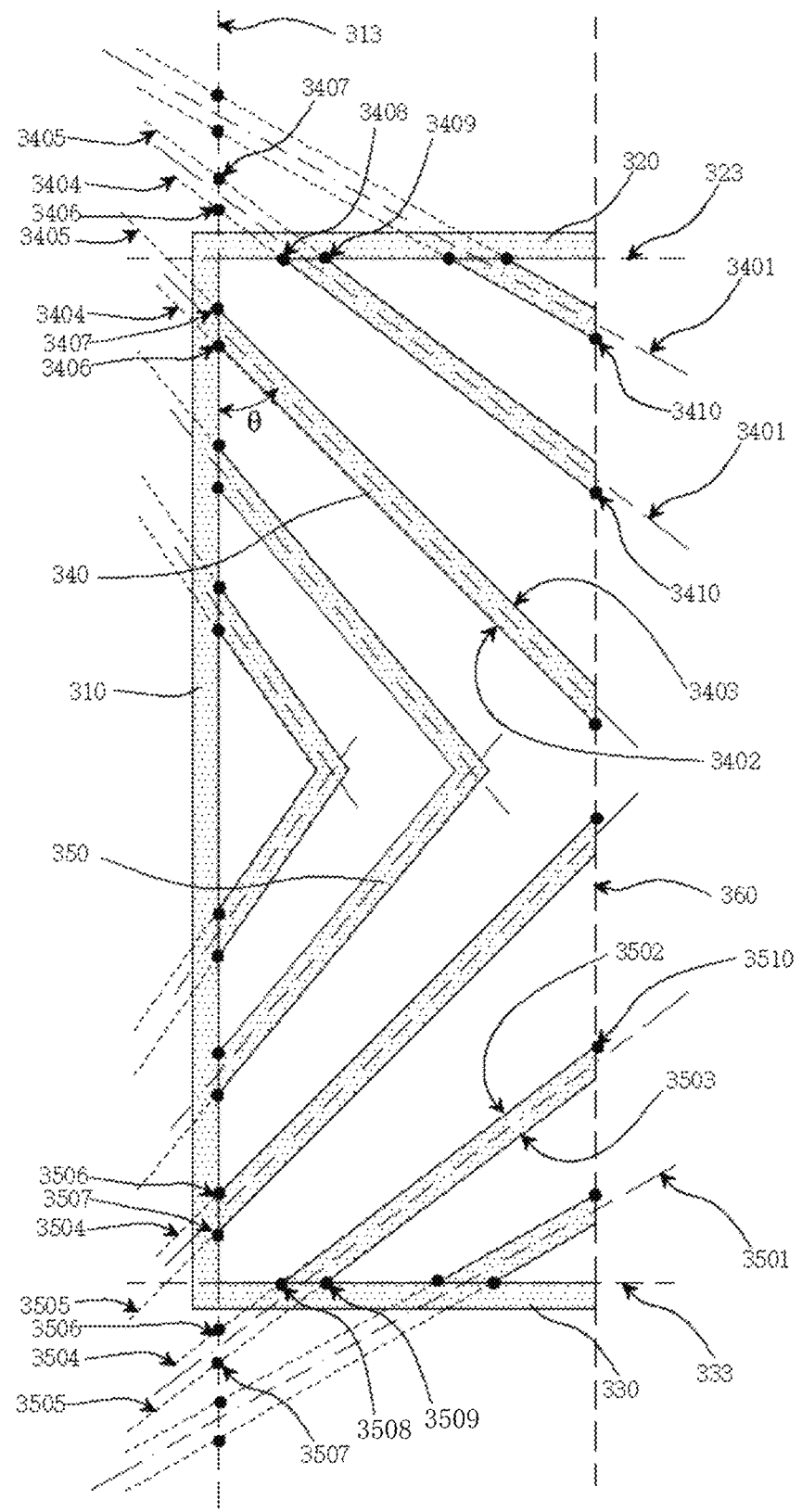
FIG. 7 is a schematic structural diagram of a slit electrode in an implementation of the present disclosure.

Optionally, referring to FIG. 6 and FIG. 7, in the extending direction of the first strip-shaped sub-electrode 340, the width of the first strip-shaped sub-electrode 340 may not change. In other words, the first auxiliary design line 3404, the second auxiliary design line 3405 and the axial line 3401 of the first strip-shaped sub-electrode 340 are parallel to each other. In this way, the design and preparation of the first strip-shaped sub-electrode 340 is facilitated.

In the present disclosure, in two adjacent first strip-shaped sub-electrodes 340, the difference value between the inclination angle of the first strip-shaped sub-electrode 340 close to the first end 3101 and the inclination angle of the other first strip-shaped sub-electrode 340 close to the second end 3102 is a gradual angle between the two adjacent first strip-shaped sub-electrodes 340. Optionally, in one slit electrode 300, the value of the gradual angle between two adjacent first strip-shaped sub-electrodes 340 ranges from 1° to 3°. In other words, in two adjacent first strip-shaped sub-electrodes 340, the inclination angle of the first strip-shaped sub-electrode 340 close to the second end is smaller than the inclination angle of the other first strip-shaped sub-electrode 340 close to the first end by 1° to 3°. Further, in two adjacent first strip-shaped sub-electrodes 340, the inclination angle of the first strip-shaped sub-electrode 340 close to the second end is smaller than the inclination angle of the other first strip-shaped sub-electrode 340 close to the first end by 1.5° to 2.5°.

Optionally, the gradual angle may be the same between any two adjacent first strip-shaped sub-electrodes 340. Exemplarily, referring to FIG. 12, in three adjacent first strip-shaped sub-electrodes 340, the gradual angle between the first strip-shaped sub-electrode 340 numbered i+2 and the first strip-shaped sub-electrode 340 numbered i+1 is a, and the gradual angle between the first strip-shaped sub-electrode 340 numbered i+1 and the first strip-shaped sub-electrode 340 numbered i is a. In an implementation of the present disclosure, the gradual angle between any two adjacent first strip-shaped sub-electrodes 340 is 2°. In another implementation of the present disclosure, the gradual angle between any two adjacent first strip-shaped sub-electrodes 340 is 1°

Optionally, in an implementation, referring to FIG. 6, in one slit electrode 300, the distance between the first design reference points 3406 of any two adjacent first strip-shaped sub-electrodes 340 is equal. Further, the distance between the second design reference points 3407 of any two adjacent first strip-shaped sub-electrodes 340 is equal, which can simplify the design of the slit electrode 300 and the design and preparation of a mask. In addition, it is also ensured that the distance between the first strip-shaped sub-electrodes 340 in the direction going away from the first connecting section 310 has a small difference in the speed of change, which may improve the uniformity of light-emission of pixels corresponding to the slit electrode 300.

Optionally, in another implementation, referring to FIG. 7, in one slit electrode 300, the first design reference points 3406 of the plurality of first strip-shaped sub-electrodes 340 connected to the first connecting section 310 are disposed at equal distance. In one slit electrode 300, in the plurality of first strip-shaped sub-electrodes 340 connected to the second connecting section 320, the distance between the first design reference points 3406 of two adjacent first strip-shaped sub-electrodes 340 decreases sequentially along the direction going away from the first end 3101 of the first connecting section 310. Furthermore, in one slit electrode 300, in the plurality of first strip-shaped sub-electrodes 340 connected to the second connecting section 320, the distance between the third design reference points 3408 of two adjacent first strip-shaped sub-electrodes 340 is the same. In this way, on the auxiliary design line 323 of the second connecting section 320, the plurality of first strip-shaped sub-electrodes 340 connected to the second connecting section 320 are disposed at equal distance, so that the design of the slit electrode 300 can also be simplified.

Optionally, in an implementation, referring to FIG. 6 and FIG. 7, in one slit electrode 300, the first auxiliary design line 3404 and the second auxiliary design line 3405 of any one first strip-shaped sub-electrode 340 are disposed in parallel, so that the width of the first strip-shaped sub-electrode 340 does not change with the change of the extending direction thereof. In this way, the width of the first strip-shaped sub-electrode 340 does not change with the extension thereof, which can simplify the design and preparation of the first strip-shaped sub-electrode 340. Furthermore, the widths of the plurality of first strip-shaped sub-electrodes 340 are the same. In other words, the widths of the plurality of first strip-shaped sub-electrodes 340 are the same, but inclination angles thereof are different, so that the distance between two adjacent first strip-shaped sub-electrodes 340 in the direction parallel to the extending direction A of the first connecting section 310 gradually increases along the direction going away from the first connecting section 310.

Figure 9:
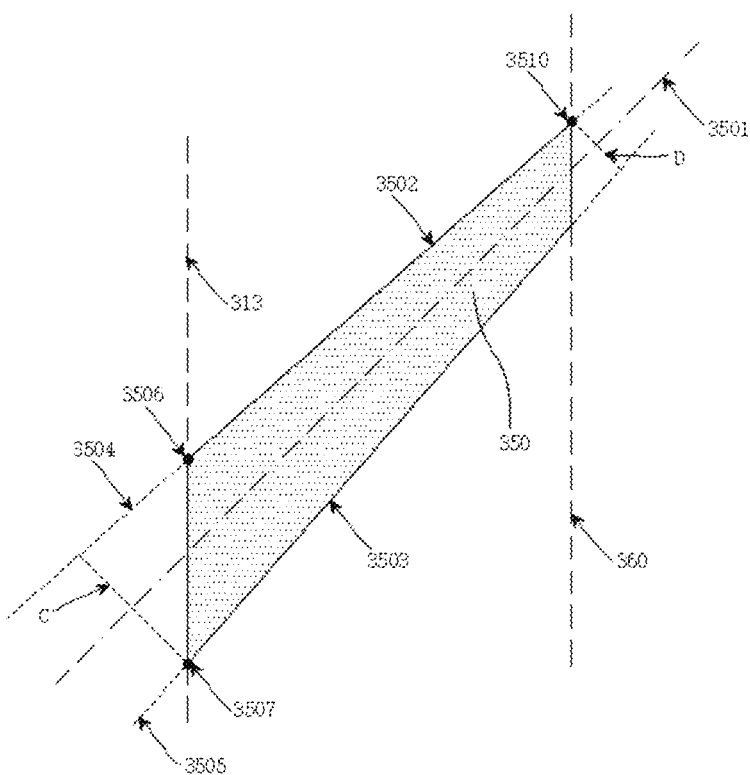
FIG. 9 is a schematic structural diagram of a second strip-shaped sub-electrode in an implementation of the present disclosure.
Figure 10:
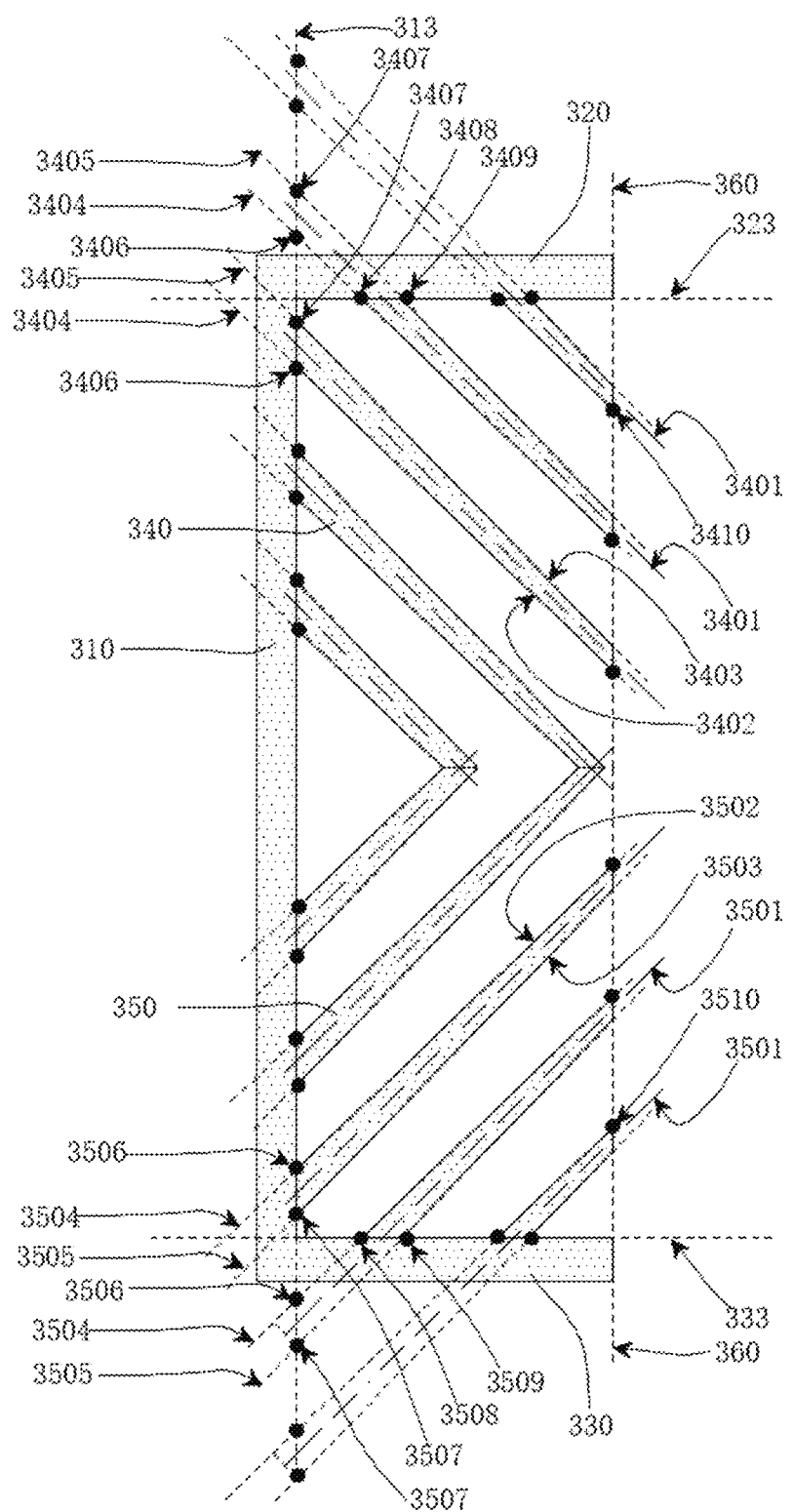
FIG. 10 is a schematic structural diagram of a slit electrode in an implementation of the present disclosure.
Figure 11:
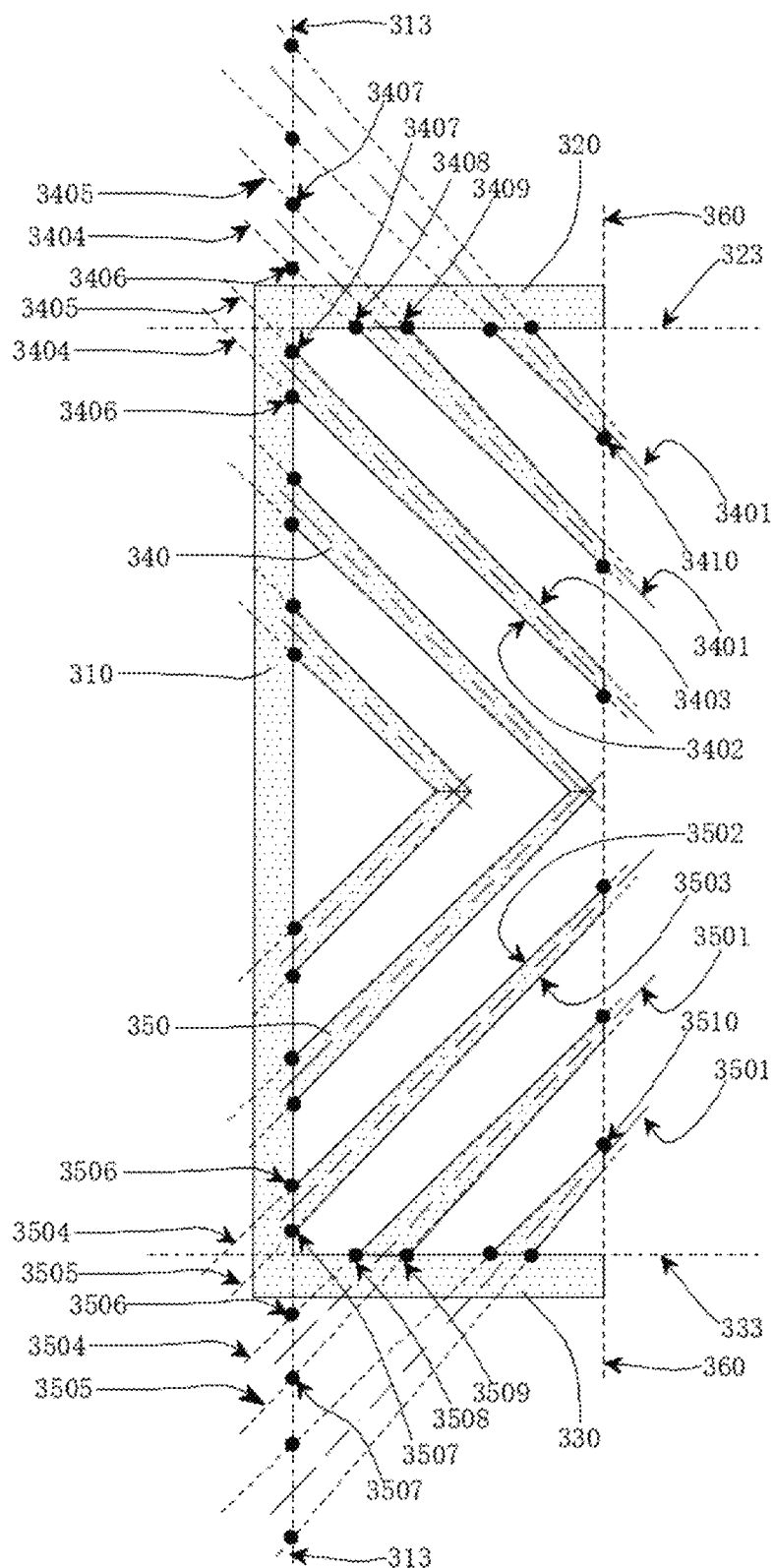
FIG. 11 is a schematic structural diagram of a slit electrode in an implementation the present disclosure.

In some other implementations, referring to FIG. 9, FIG. 10, and FIG. 11, in the direction going away from the first connecting section 310, the width of the first strip-shaped sub-electrode 340 gradually decreases. The distance between two adjacent first strip-shaped sub-electrodes 340 in the direction parallel to the extending direction A of the first connecting section 310 gradually increases along the direction going away from the first connecting section 310. In this way, according to the first domain structure of the slit electrode 300, the first strip-shaped sub-electrode 340 can be gradually narrowed along the direction going away from the first connecting section 310 by adjusting the width of the first strip-shaped sub-electrode 340, such that the distance between the first strip-shaped sub-electrodes 340 gradually increases along the direction going away from the first connecting section 310. The first strip-shaped sub-electrode 340 may be designed in a variety of different ways, so as to adjust the width of the first strip-shaped sub-electrode 340.

Optionally, referring to FIG. 9, FIG. 10, and FIG. 11, in one slit electrode 300, the first edges 3402 of the first strip-shaped sub-electrodes 340 are parallel to each other, or the second edges 3403 of the first strip-shaped sub-electrodes 340 are parallel to each other, or the axial lines 3401 of the first strip-shaped sub-electrodes 340 are parallel, which facilitates the design and preparation of the first strip-shaped sub-electrodes 340.

Optionally, referring to FIG. 10 and FIG. 11, in the plurality of first strip-shaped sub-electrodes 340 connected to the first connecting section 310, the distance between the first design reference points 3406 of any two adjacent first strip-shaped sub-electrodes 340 is equal.

Optionally, referring to FIG. 10 and FIG. 11, in one slit electrode 300, the first design reference sizes of at least part of the first strip-shaped sub-electrodes 340 are the same. Exemplarily, in one slit electrode 300, the distance between the first design reference points 3406 of any two adjacent first strip-shaped sub-electrodes 340 is equal. Further, referring to FIG. 10, the first design reference sizes of respective first strip-shaped sub-electrodes 340 are the same.

In another example, in one slit electrode 300, referring to FIG. 11, in the plurality of first strip-shaped sub-electrodes 340 connected to the first connecting section 310, the distance between the first design reference points 3406 of any two adjacent first strip-shaped sub-electrodes 340 is equal, and the first design reference sizes of the first strip-shaped sub-electrodes 340 are the same. In the plurality of first strip-shaped sub-electrodes 340 connected to the second connecting section 320, the distance between the third design reference points 3408 of any two adjacent first strip-shaped sub-electrodes 340 is equal, and the second design reference sizes of the first strip-shaped sub-electrodes 340 are the same.

In an implementation of the present disclosure, referring to FIG. 10, the first design reference points 3406 of the first strip-shaped sub-electrodes 340 are at equal distance, the first design reference sizes of the first strip-shaped sub-electrodes 340 are the same, the axial lines 3401 of the first strip-shaped sub-electrodes 340 are parallel to each other, the first auxiliary design lines 3404 of the first strip-shaped sub-electrodes 340 are parallel to each other, and the second auxiliary design lines 3405 of the first strip-shaped sub-electrodes 340 are parallel to each other. In this way, it can be ensured that the distance between the first strip-shaped sub-electrodes 340 of the slit electrode 300 uniformly changes gradually along the direction going away from the first connecting section 310.

In the present disclosure, the width of the first strip-shaped sub-electrode 340 refers to the length of a line segment perpendicular to the axial line 3401 of the first strip-shaped sub-electrode 340 and connecting the first auxiliary design line 3404 and the second auxiliary design line 3405 of the first strip-shaped sub-electrode 340.

Figure 8:
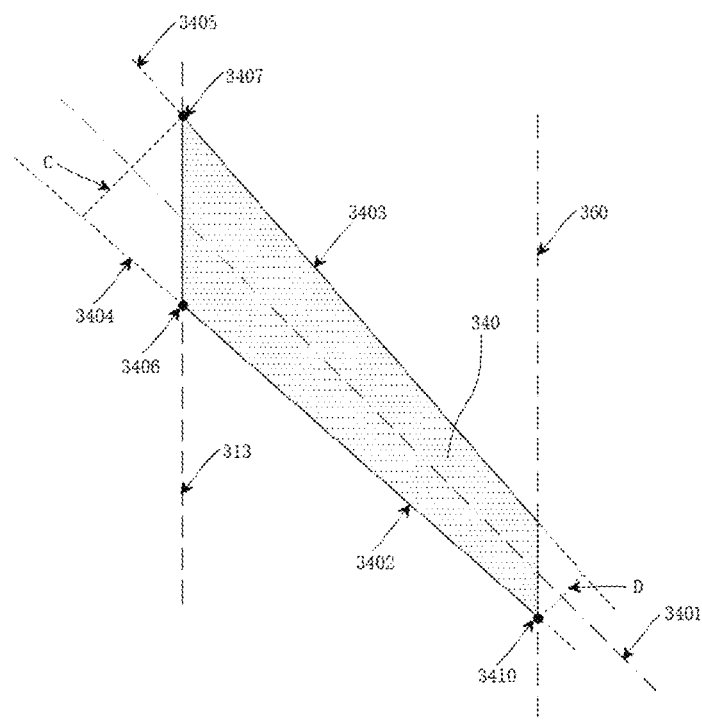
FIG. 8 is a schematic structural diagram of a first strip-shaped sub-electrode in an implementation of the present disclosure.

For example, referring to FIG. 8, the width of the first strip-shaped sub-electrode 340 at the second design reference point 3407 thereof refers to the length of the first line segment C. Here, the first line segment C passes through the second design reference point 3407 of the first strip-shaped sub-electrode 340, is perpendicular to the axial line 3401 of the first strip-shaped sub-electrode 340, and connects the first auxiliary design line 3404 and the second auxiliary design line 3405 of the first strip-shaped sub-electrode 340.

For another example, the intersection point between the orthographic projection of the first auxiliary design line 3404 of the first strip-shaped sub-electrode 340 on the base substrate 101 and the orthographic projection of the virtual connecting line 360 on the base substrate 101 is a fifth design reference point 3410 of the first strip-shaped sub-electrode 340. The width of the first strip-shaped sub-electrode 340 at the fifth design reference point 3410 thereof refers to the length of the second line segment D. Here, the second line segment D passes through the fifth design reference point 3410 of the first strip-shaped sub-electrode 340, is perpendicular to the axial line 3401 of the first strip-shaped sub-electrode 340, and connect the first auxiliary design line 3404 and the second auxiliary design line 3405 of the first strip-shaped sub-electrode 340.

In a design of the slit electrode 300, a first dummy electrode in the shape of an isosceles trapezoid is drawn based on the first line segment C, the second line segment D, the first auxiliary design line 3404, and the second auxiliary design line 3405 of one first strip-shaped sub-electrode 340. Then, the first dummy electrode is duplicated at equal distance along the auxiliary design line 313 of the first connecting section 310 to acquire a plurality of first dummy electrodes in the shape of an isosceles trapezoid. Afterwards, each first dummy electrode is modified to remove the part which is not in electrode space defined by the auxiliary design line 313 of the first connecting section 310, the auxiliary design line 323 of the second connecting section 320, and the virtual connecting line 360. Certainly, if one or more first strip-shaped sub-electrodes 340 need to form a strip-shaped sub-electrode group 400 with the second strip-shaped sub-electrode 350, the part, going beyond the second strip-shaped sub-electrode 350, of the one or more first dummy electrodes is are removed. In this way, the modified first dummy electrode can serve as a design layout of the first strip-shaped sub-electrode 340.

According to the above design, in one slit electrode 300, the widths of the ends, away from the first connecting section 310, of at least part of the first strip-shaped sub-electrodes 340 are the same. For example, the first strip-shaped sub-electrodes 340 which are extendable to the virtual connecting line 360 have the same width at the fifth design reference point 3410 of the first strip-shaped sub-electrode 340.

Optionally, the width of the first strip-shaped sub-electrode 340 at the second design reference point 3407 thereof may be 0.4 to 0.8 times the width of the first strip-shaped sub-electrode 340 at the fifth design reference point 3410 thereof. Correspondingly, part of the first strip-shaped sub-electrodes 340 extend to the virtual connecting line 360 and have third edges overlapped with the virtual connecting line 360. The size of the third edge is 0.4 to 0.8 times the first design reference size of the first strip-shaped sub-electrode 340 connected to the first connecting section 310. Exemplarily, in an implementation of the present disclosure, the distance between the axial lines 3401 of two adjacent first strip-shaped sub-electrodes 340 is 6.6 micrometers, the width of the first strip-shaped sub-electrode 340 at the second design reference point 3406 thereof is 3.6 micrometers, and the width of the first strip-shaped sub-electrode 340 at the fifth design reference point 3410 thereof is 2.3 micrometers.

In another implementation of the present disclosure, referring to FIG. 11, in one slit electrode 300, the axial lines 3401 of the first strip-shaped sub-electrodes 340 are parallel to each other. In the plurality of first strip-shaped sub-electrodes 340 connected to the first connecting section 310, the first design reference sizes of the first strip-shaped sub-electrodes 340 are the same. In the plurality of first strip-shaped sub-electrodes 340 connected to the second connecting section 320, the second design reference sizes of the first strip-shaped sub-electrodes 340 are the same. The distance between the axial lines 3401 of two adjacent first strip-shaped sub-electrodes 340 is equal.

In a design of the slit electrode 300, a second dummy electrode may be drawn at first. The second dummy electrode is rectangular and includes a first short side and a second short side which are opposite, and a first long side and a second long side which are opposite. The first short side coincides with the first line segment C; the first long side and the second long side are parallel to the axial line 3401 of the first strip-shaped sub-electrode 340, and one vertex of the second long side is the second design reference point 3407 of the first strip-shaped sub-electrode 340. The intersection point of the second short side and the virtual connecting line 360 serves as the fifth design reference point 3410 of the first strip-shaped sub-electrode 340. Then, the second dummy electrode is duplicated and arranged at equal distance along the auxiliary design line 313 of the first connecting section 310 to form a plurality of second dummy electrodes in one-to-one correspondence to the plurality of first strip-shaped sub-electrodes 340.

Each of the plurality of first strip-shaped sub-electrodes 340 connected to the first connecting section 310 may be designed by modifying the corresponding second dummy electrode as follows. The second line segment D is determined at the second short side, and the center of the second line segment D coincides with the center of the first line segment C. The first auxiliary design line 3404 of the first strip-shaped sub-electrode 340 is determined, and the first auxiliary design line 3404 of the first strip-shaped sub-electrode 340 passes through the fifth design reference point 3410 of the first strip-shaped sub-electrode 340 and passes through the endpoint, away from the second design reference point 3407 of the first strip-shaped sub-electrode 340, of the first short side. The second auxiliary design line 3405 of the first strip-shaped sub-electrode 340 is determined, and the second auxiliary design line 3405 of the first strip-shaped sub-electrode 340 passes through the endpoint, away from the fifth design reference point 3410 of the first strip-shaped sub-electrode 340, of the second line segment D, and passes through the second design reference point 3407 of the first strip-shaped sub-electrode 340. The design layout of respective first strip-shaped sub-electrodes 340 connected to the first connecting section 310 is determined based on the second design reference point 3407, the fifth design reference point 3410, the first auxiliary design line 3404 and the second auxiliary design line 3405 of the first strip-shaped sub-electrode 340, and based on the auxiliary design line 313 of the first connecting section 310 and the virtual connecting line 360.

It can be understood that when the first strip-shaped sub-electrode 340 and the second strip-shaped sub-electrode 350 form a strip-shaped sub-electrode group 400, the design layout of the first strip-shaped sub-electrode 340 may also be further correspondingly modified.

Each of the plurality of first strip-shaped sub-electrodes 340 connected to the second connecting section 320 may be designed by modifying the corresponding second dummy electrode as follows. The intersection point of the first long side of the second dummy electrode and the auxiliary design line 323 of the second connecting section 320 is taken as the third design reference point 3408 of the first strip-shaped sub-electrode 340. The intersection point of the second long side of the second dummy electrode and the auxiliary design line 323 of the second connecting section 320 is taken as the fourth design reference point 3409 of the first strip-shaped sub-electrode 340. The second line segment D is determined on the second short side, and the center of the second line segment D coincides with the center of the second short side. The first auxiliary design line 3404 of the first strip-shaped sub-electrode 340 is determined, and the first auxiliary design line 3404 of the first strip-shaped sub-electrode 340 passes through the fifth design reference point 3410 of the first strip-shaped sub-electrode 340, and passes through the third design reference point 3408 of the first strip-shaped sub-electrode 340. The second auxiliary design line 3405 of the first strip-shaped sub-electrode 340 is determined, and the second auxiliary design line 3405 of the first strip-shaped sub-electrode 340 passes through the fourth design reference point 3409 of the first strip-shaped sub-electrode 340, and passes through the endpoint, away from the fifth design reference point 3410 of the first strip-shaped sub-electrode 340, of the second line segment D. The design layout of respective first strip-shaped sub-electrodes 340 connected to the second connecting section 320 is determined based on the first auxiliary design line 3404 and the second auxiliary design line 3405 of the first strip-shaped sub-electrode 340, the auxiliary design line 323 of the second connecting section 320 and the virtual connecting line 360.

Optionally, the value of an angle between the extending direction of the first connecting section 310 and at least one of the first edge 3402 of the first strip-shaped sub-electrode 340, the second edge 3403 of the first strip-shaped sub-electrode 340, and the axial line 3401 of the first strip-shaped sub-electrode 340 ranges from 40° to 50°. Exemplarily, the angle between the axial line 3401 of the first strip-shaped sub-electrode 340 and the extending direction of the first connecting section 310 is 45°.

In the implementation of the present disclosure, referring to FIG. 3, FIG. 6, FIG. 7, FIG. 10, and FIG. 11, any second strip-shaped sub-electrode 350 has a first edge 3502 and a second edge 3503 which are opposite and connected to the electrode connecting portion 301, and the first edge 3502 is farther from the second end 3302 of the third connecting section 330 than the second edge 3503 is. The straight line on which an orthographic projection of the first edge 3502 of the second strip-shaped sub-electrode 350 on the base substrate 101 is located is a first auxiliary design line 3504 of the second strip-shaped sub-electrode 350. The straight line on which an orthographic projection of the second edge 3503 of the second strip-shaped sub-electrode 350 on the base substrate 101 is located is a second auxiliary design line 3505 of the second strip-shaped sub-electrode 350. The second strip-shaped sub-electrode 350 extends along the axial line direction thereof, and any point on the axial line 3501 of the second strip-shaped sub-electrode 350 is equidistant from the first auxiliary design line 3504 and the second auxiliary design line 3505 of the second strip-shaped sub-electrode 350. The angle between the extending direction of the second strip-shaped sub-electrode 350 and the extending direction of the first connecting section 310 is the inclination angle θ of the second strip-shaped sub-electrode 350, and the inclination angle θ is an acute angle.

In one slit electrode 300, the intersection point of the first auxiliary design line 3504 of the second strip-shaped sub-electrode 350 and the auxiliary design line 313 of the first connecting section 310 is a first design reference point 3506 of the second strip-shaped sub-electrode 350. The intersection point of the second auxiliary design line 3505 of the second strip-shaped sub-electrode 350 and the auxiliary design line 313 of the first connecting section 310 is a second design reference point 3507 of the second strip-shaped sub-electrode 350. The distance between the first design reference point 3506 and the second design reference point 3507 of the second strip-shaped sub-electrode 350 is a first design reference size of the second strip-shaped sub-electrode 350.

In one slit electrode 300, referring to FIG. 3, the third connecting section 330 has a first edge 331 and a second edge 332 which are opposite to each other. The second edge 332 is farther from the second strip-shaped sub-electrode 350 than the first edge 331 is. The straight line on which an orthographic projection of the first edge 331 of the third connecting section 330 on the base substrate 101 is located is an auxiliary design line 333 of the third connecting section 330. Further, the auxiliary design line 333 of the third connecting section 330 is parallel to the pixel row direction of the array substrate.

Referring to FIG. 6, FIG. 7, FIG. 10 and FIG. 11, the intersection point of the first auxiliary design line 3504 of the second strip-shaped sub-electrode 350 and the auxiliary design line 333 of the third connecting section 330 is the third design reference point 3508 of the second strip-shaped sub-electrode 350. The intersection point of the second auxiliary design line 3505 of the second strip-shaped sub-electrode 350 and the auxiliary design line 333 of the third connecting section 330 is the fourth design reference point 3509 of the second strip-shaped sub-electrode 350. The distance between the third design reference point 3508 and the fourth design reference point 3509 of the second strip-shaped sub-electrode 350 is the second design reference size of the second strip-shaped sub-electrode 350.

Figure 13:
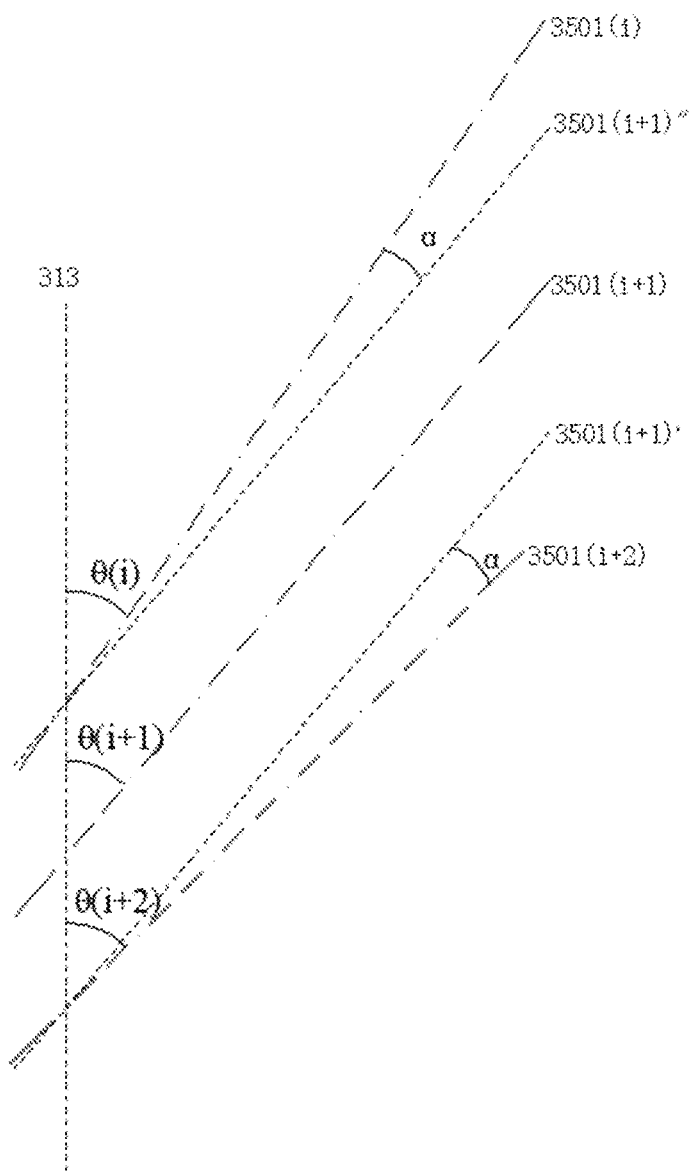
FIG. 13 is a schematic diagram of axial lines and inclination angles of three adjacent second strip-shaped sub-electrodes in an implementation of the present disclosure.

In some implementation, in FIG. 6, FIG. 7 and FIG. 13, in two adjacent second strip-shaped sub-electrodes 350, the inclination angle of the second strip-shaped sub-electrode 350 close to the second end 3102 of the first connecting section 310 is greater than the inclination angle of the other second strip-shaped sub-electrode 350 close to the first end 3101 of the first connecting section 310. In this way, the second strip-shaped sub-electrodes 350 are divergently disposed in the direction going away from the first connecting section 310, so that the distance between the second strip-shaped sub-electrodes 350 gradually increases in the direction going away from the first connecting section 310.

For example, in the direction from the first end 3101 to the second end 3102 of the first connecting section 310, the second strip-shaped sub-electrodes 350 are sequentially numbered from the serial number 1. FIG. 13 shows the axial lines 3501 of three adjacent second strip-shaped sub-electrodes 350. The dashed line 3501($i$+1)' and the dashed line 3501($i$+1)'' are parallel to the axial line 3501($i$+1). Referring to FIG. 13, the axial line 3501($i$) is the axial line of the second strip-shaped sub-electrode 350 numbered i, the axial line 3501($i$+1) is the axial line of the second strip-shaped sub-electrode 350 numbered i+1, and the axial line 3501($i$+2) is the axial line of the second strip-shaped sub-electrode 350 numbered i+2. The inclination angle θ(i) is the inclination angle of the second strip-shaped sub-electrode 350 numbered i, the inclination angle θ(i+1) is the inclination angle of the second strip-shaped sub-electrode 350 numbered i+1, and the inclination angle θ(i+2) is the inclination angle of the second strip-shaped sub-electrode 350 numbered i+2; the inclination angle θ(i), the inclination angle θ(i+1), the inclination angle θ(i+2) increase sequentially, that is, θ($i$+2)>θ(i+1)>θ(i).

Optionally, referring to FIG. 6 and FIG. 7, along the extending direction of the second strip-shaped sub-electrode 350, the width of the second strip-shaped sub-electrode 350 may not change. In other words, the first auxiliary design line 3504, the second auxiliary design line 3505, and the axial line 3501 of the second strip-shaped sub-electrode 350 are parallel to each other. In this way, the design and preparation of the second strip-shaped sub-electrode 350 can be facilitated.

In the present disclosure, in two adjacent second strip-shaped sub-electrodes 350, the difference value between the inclination angle of the second strip-shaped sub-electrode 350 close to the second end 3102 of the first connecting section 310 and the inclination angle of the second strip-shaped sub-electrode 350 close to the first end 3101 of the first connecting section 310 is the gradual angle between the two adjacent second strip-shaped sub-electrodes 350. Optionally, in one slit electrode 300, the value of the gradual angle between two adjacent second strip-shaped sub-electrodes 350 ranges from 1° to 3°. In other words, in the two adjacent second strip-shaped sub-electrodes 350, the inclination angle of the second strip-shaped sub-electrode 350 close to the second end 3102 is greater than the inclination angle of the other second strip-shaped sub-electrode 350 close to the first end 3101 by 1° to 3°. Further, in two adjacent second strip-shaped sub-electrodes 350, the inclination angle of the second strip-shaped sub-electrode 350 close to the second end is greater than the inclination angle of the other second strip-shaped sub-electrode 350 close to the first end by 1.5° to 2.5°.

Optionally, the gradual angle between any two adjacent second strip-shaped sub-electrodes 350 may be the same. Exemplarily, referring to FIG. 13, in three adjacent second strip-shaped sub-electrodes 350, the gradual angle between the second strip-shaped sub-electrode 350 numbered i+2 and the second strip-shaped sub-electrode 350 numbered i+1 is a, and the gradual angle between the second strip-shaped sub-electrode 350 numbered i+1 and the second strip-shaped sub-electrode 350 numbered i is a. In an implementation of the present disclosure, the gradual angle between any two adjacent second strip-shaped sub-electrodes 350 is 2°. In another implementation of the present disclosure, the gradual angle between any two adjacent second strip-shaped sub-electrodes 350 is 1°.

Optionally, in an implementation, in one slit electrode 300, referring to FIG. 6, the distance between the first design reference points 3506 of any two adjacent second strip-shaped sub-electrodes 350 is equal. Further, the distance between the second design reference points 3507 of any two adjacent second strip-shaped sub-electrodes 350 is equal. On the auxiliary design line 313 of the first connecting section 310, the respective second strip-shaped sub-electrodes 350 are disposed at equal distance, which can simplify the design of the slit electrode 300 and the design and preparation of a mask. Not only that, it is also ensured that the distance between the second strip-shaped sub-electrodes 350 in the direction going away from the first connecting section 310 has a small difference in the speed of change, which is beneficial to improve the uniformity of light emission of pixels corresponding to the slit electrode 300.

Optionally, in another implementation, referring to FIG. 7, in one slit electrode 300, in the plurality of second strip-shaped sub-electrodes 350 connected to the first connecting section 310, the first design reference points 3506 of the second strip-shaped sub-electrodes 350 are disposed at equal distance. In one slit electrode 300, in the plurality of second strip-shaped sub-electrodes 350 connected to the third connecting section 330, the distance between the first design reference points 3506 of two adjacent second strip-shaped sub-electrodes 350 decreases sequentially in the direction going away from the first end 3101 of the first connecting section 310. Furthermore, in one slit electrode 300, in the plurality of second strip-shaped sub-electrodes 350 connected to the third connecting section 330, the distance between the third design reference points 3508 of two adjacent second strip-shaped sub-electrodes 350 is equal. In this way, on the auxiliary design line 333 of the third connecting section 330, the respective second strip-shaped sub-electrodes 350 connected to the third connecting section 330 are disposed at equal distance, so that the design of the slit electrode 300 can further be simplified.

Optionally, in an implementation, in one slit electrode 300, referring to FIG. 6 and FIG. 7, the first auxiliary design line 3504 and the second auxiliary design line 3505 of the second strip-shaped sub-electrode 350 are disposed in parallel, so that the width of the second strip-shaped sub-electrode 350 does not change with the change of the extending direction thereof. In this way, the width of the second strip-shaped sub-electrode 350 does not change with the extension thereof, which can simplify the design and preparation of the second strip-shaped sub-electrode 350. Furthermore, the widths of the second strip-shaped sub-electrodes 350 are the same. In other words, the widths of the second strip-shaped sub-electrodes 350 are the same, but the inclination angles thereof are different, so that the distance between two adjacent second strip-shaped sub-electrodes 350 in the direction parallel to the extending direction A of the first connecting section 310 gradually increases in the direction going away from the first connecting section 310.

In some other implementations, referring to FIG. 9 to FIG. 11, in the direction going away from the first connecting section 310, the width of the second strip-shaped sub-electrode 350 gradually decreases. The distance between two adjacent second strip-shaped sub-electrodes 350 in the direction parallel to the extending direction A of the first connecting section 310 gradually increases along the direction going away from the first connecting section 310. In this way, according to the second domain structure of the slit electrode 300, the second strip-shaped sub-electrode 350 can be gradually narrowed in the direction going away from the first connecting section 310 by adjusting the width of the second strip-shaped sub-electrode 350, such that the distance between the second strip-shaped sub-electrodes 350 gradually increases along the direction going away from the first connecting section 310. The second strip-shaped sub-electrode 350 can be designed in a variety of different ways, so as to adjust the width of the second strip-shaped sub-electrode 350.

In the present disclosure, the width of the second strip-shaped sub-electrode 350 refers to the length of the line segment perpendicular to the axial line 3501 of the second strip-shaped sub-electrode 350 and connecting the first auxiliary design line 3504 and the second auxiliary design line 3505 of the second strip-shaped sub-electrode 350.

For example, the width of the second strip-shaped sub-electrode 350 at the second design reference point thereof refers to the length of the first line segment C. The first line segment C passes through the second design reference point 3507 of the second strip-shaped sub-electrode 350, is perpendicular to the axial line 3501 of the second strip-shaped sub-electrode 350, and connects the first auxiliary design line 3504 and the second auxiliary design line 3505 of the second strip-shaped sub-electrode 350.

For another example, the intersection point between the orthographic projection of the first auxiliary design line 3504 of the second strip-shaped sub-electrode 350 on the base substrate 101 and the orthographic projection of the virtual line segment 360 on the base substrate 101 is a fifth design reference point 3510 of the second strip-shaped sub-electrode 350. The width of the second strip-shaped sub-electrode 350 at the fifth design reference point 3510 thereof refers to the length of the second line segment D. The second line segment D passes through the fifth design reference point 3510 of the second strip-shaped sub-electrode 350, is perpendicular to the axial line 3501 of the second strip-shaped sub-electrode 350, and connects the first auxiliary design line 3504 and the second auxiliary design line 3505 of the second strip-shaped sub-electrode 350.

Optionally, in one slit electrode 300, the first edges 3502 of the plurality of second strip-shaped sub-electrodes 350 are parallel to each other, or the second edges 3503 of the plurality of second strip-shaped sub-electrodes 350 are parallel to each other, or the axial lines 3501 of the plurality of second strip-shaped sub-electrodes 350 are parallel, which facilitates the design and preparation of the second strip-shaped sub-electrodes 350.

Optionally, referring to FIG. 10 and FIG. 11, in the plurality of second strip-shaped sub-electrodes 350 connected to the first connecting section 310, the distance between the first design reference points 3506 of any two adjacent second strip-shaped sub-electrodes 350 is equal.

Optionally, referring to FIG. 10 and FIG. 11, in one slit electrode 300, the first design reference sizes of at least part of the second strip-shaped sub-electrodes 350 are the same. Exemplarily, referring to FIG. 10, in one slit electrode 300, the distance between the first design reference points 3506 of any two adjacent second strip-shaped sub-electrodes 350 is equal. Furthermore, the first design reference sizes of the respective second strip-shaped sub-electrodes 350 are the same.

For another example, in one slit electrode 300, referring to FIG. 11, in the plurality of second strip-shaped sub-electrodes 350 connected to the first connecting section 310, the distance between the first design reference points 3506 of any two adjacent second strip-shaped sub-electrodes 350 is equal, and the first design reference sizes of the respective second strip-shaped sub-electrodes 350 are the same. In the plurality of second strip-shaped sub-electrodes 350 connected to the third connecting section 330, the distance between the third design reference points 3508 of any two adjacent second strip-shaped sub-electrodes 350 is equal, and the second design reference sizes of the respective second strip-shaped sub-electrodes 350 are the same.

In an implementation of the present disclosure, referring to FIG. 10, the distance between the first design reference points 3506 of any two adjacent second strip-shaped sub-electrodes 350 is equal, the first design reference sizes of the respective second strip-shaped sub-electrodes 350 are the same, the axial lines 3501 of the respective second strip-shaped sub-electrodes 350 are parallel to each other, the first auxiliary design lines 3504 of the respective second strip-shaped sub-electrodes 350 are parallel to each other, and the second auxiliary design lines 3505 of the respective second strip-shaped sub-electrodes 350 are parallel to each other. In this way, it can be ensured that the distance between the second strip-shaped sub-electrodes 350 of the slit electrode 300 uniformly changes gradually along the direction going away from the first connecting section 310.

Optionally, the width of the second strip-shaped sub-electrode 350 at the second design reference point 3507 thereof may be 0.4 to 0.8 times the width of the second strip-shaped sub-electrode 350 at the fifth design reference point 3510 thereof. Correspondingly, part of the second strip-shaped sub-electrodes 350 extend to the virtual connecting line 360 and have third edges overlapped with the virtual connecting line 360. The size of the third edge is 0.4 to 0.8 times the first design reference size of the second strip-shaped sub-electrode 350 connected to the first connecting section 310. Exemplarily, in an implementation of the present disclosure, the distance between the axial lines 3501 of two adjacent second strip-shaped sub-electrodes 350 is 6.6 micrometers, the width of the second strip-shaped sub-electrode 350 at the second design reference point 3507 thereof is 3.6 micrometers, and the width of the second strip-shaped sub-electrode 350 at the fifth design reference point 3510 thereof is 2.3 micrometers.

In another implementation of the present disclosure, referring to FIG. 11, in one slit electrode 300, the axial lines 3501 of the second strip-shaped sub-electrodes 350 are parallel. In the plurality of second strip-shaped sub-electrodes 350 connected to the first connecting section 310, the first design reference sizes of the second strip-shaped sub-electrodes 350 are the same. In the plurality of second strip-shaped sub-electrodes 350 connected to the third connecting section 330, the second design reference sizes of the second strip-shaped sub-electrodes 350 are the same. The distance between the axial lines 3501 of two adjacent second strip-shaped sub-electrodes 350 is equal.

Optionally, the value of an angle between the extending direction of the first connecting section 310 and at least one of the first edge 3502 of the second strip-shaped sub-electrode 350, the second edge 3503 of the second strip-shaped sub-electrode 350, and the axial line 3501 of the second strip-shaped sub-electrode 350 ranges from 40° to 50°. Exemplarily, the angle between the axial line 3501 of the second strip-shaped sub-electrode 350 and the extending direction of the first connecting section 310 is 45°.

Optionally, in an implementation of the present disclosure, the slit electrode 300 includes the first strip-shaped sub-electrodes 340 and the second strip-shaped sub-electrodes 350. The first auxiliary design lines 3404 of respective first strip-shaped sub-electrodes 340 and the first auxiliary design lines 3504 of respective second strip-shaped sub-electrodes 350 are symmetrically disposed, and the second auxiliary design lines 3405 of respective first strip-shaped sub-electrodes 340 and the second auxiliary design lines 3505 of respective second strip-shaped sub-electrodes 350 are symmetrically disposed. In this way, the slit electrode 300 can improve display uniformity on the premise of overcoming disclination. Certainly, in other implementations, patterns of the first strip-shaped sub-electrodes 340 and patterns of the second strip-shaped sub-electrodes 350 may also be set independently.

Exemplarily, in an implementation of the present disclosure, the slit electrode 300 includes the first strip-shaped sub-electrodes 340 and the second strip-shaped sub-electrodes 350. The widths of the plurality of first strip-shaped sub-electrodes 340 are the same, and the first design reference points 3406 of respective first strip-shaped sub-electrodes 340 are disposed at equal distance. The gradual angle of two adjacent first strip-shaped sub-electrodes 340 is equal. The first auxiliary design lines 3404 of respective first strip-shaped sub-electrodes 340 and the first auxiliary design lines 3504 of respective second strip-shaped sub-electrodes 350 are symmetrically disposed. The second auxiliary design lines 3405 of respective first strip-shaped sub-electrodes 340 and the second auxiliary design lines 3505 of respective second strip-shaped sub-electrodes 350 are symmetrically disposed.

Figure 14:
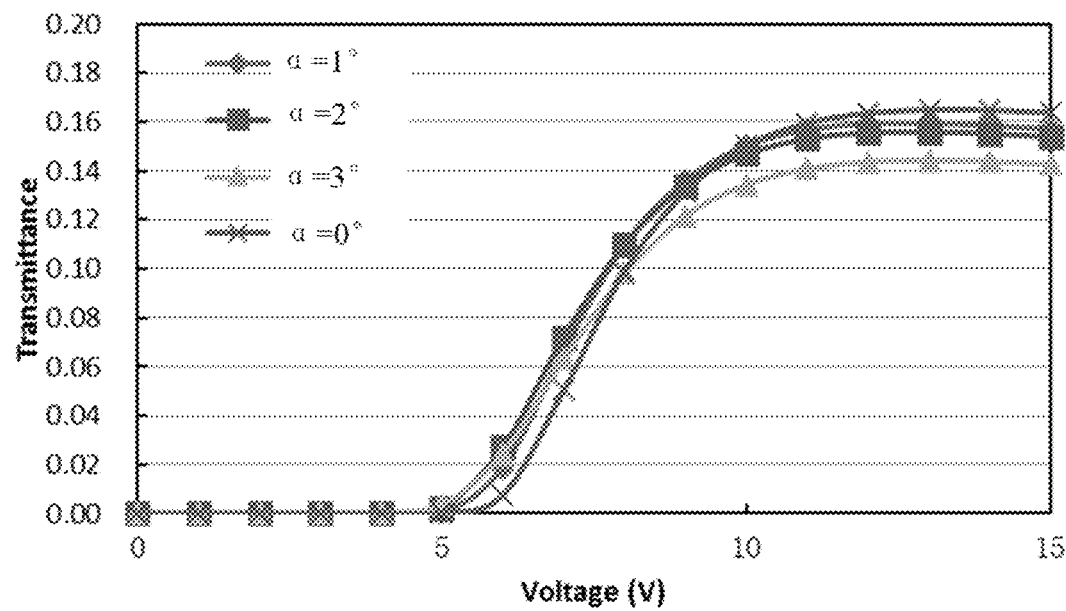
FIG. 14 shows the distribution of light transmittance of a display panel under different driving voltages when the value of a gradual angle $\alpha$ is 0°, 1°, 2°, and 3° respectively.

FIG. 14 shows the distribution of light transmittance of the display panel under different driving voltages when the gradual angle α between two adjacent first strip-shaped sub-electrodes 340 is 0°, 1°, 2°, and 3° respectively. Referring to FIG. 14, compared with the solution in which respective first strip-shaped sub-electrodes 340 are disposed in parallel, when the value of the gradual angle α between two adjacent first strip-shaped sub-electrodes 340 is 1°, 2°, and 3° respectively, the corresponding start voltage decreases when liquid crystals of the display panel start to deflect. When the driving voltage is 10V, and the gradual angle is 1° and 2° respectively, the light transmittance of the display panel is basically the same as that when the gradual angle is 0°.

Figure 15:
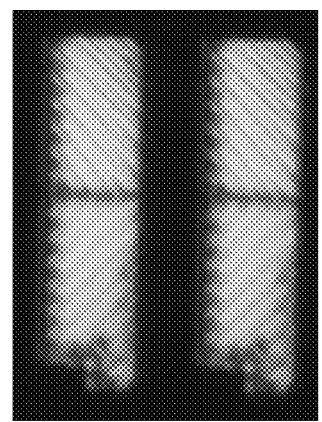
FIG. 15 shows the lighting situation of pixels corresponding to a slit electrode in a liquid crystal display panel when the gradual angle is 2° in an implementation of the present disclosure.
Figure 16:
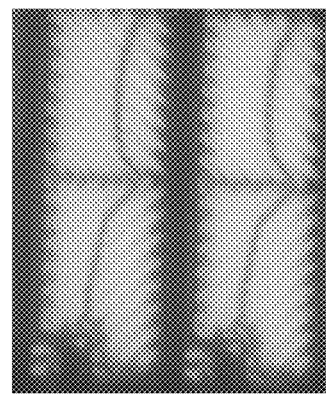
FIG. 16 shows the lighting situation of pixels corresponding to a slit electrode in a liquid crystal display panel when the gradual angle is 0° in an implementation of the present disclosure.

FIG. 15 shows the lighting situation of pixels corresponding to the slit electrode 300 in the liquid crystal display panel when the gradual angle is 2°. FIG. 16 shows the lighting situation of the pixels corresponding to the slit electrode 300 in the liquid crystal display panel when the gradual angle is 0°. By comparing FIG. 15 and FIG. 16, it can be seen that when the gradual angle is 2°, no disclination occurs on the liquid crystal display panel. When the gradual angle is 0°, obvious disclination occurs on the liquid crystal display panel.

Figure 17:
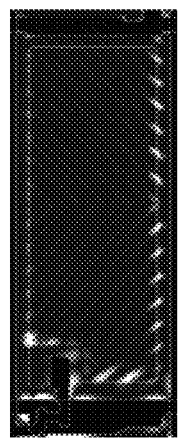
FIG. 17 shows the lighting situation of pixels corresponding to a slit electrode in a liquid crystal display panel under a driving voltage of 4V when the gradual angle is 1° in an implementation of the present disclosure.
Figure 18:
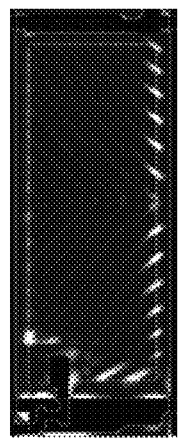
FIG. 18 shows the lighting situation of pixels corresponding to a slit electrode in a liquid crystal display panel under a driving voltage of 4V when the gradual angle is 2° in an implementation of the present disclosure.
Figure 19:
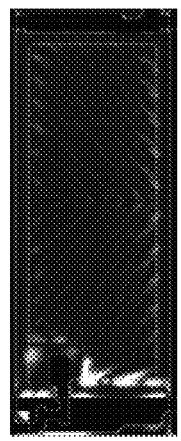
FIG. 19 shows the lighting situation of pixels corresponding to a slit electrode in a liquid crystal display panel under a driving voltage of 4V when the gradual angle is 3° in an implementation of the present disclosure.

FIG. 17 shows the lighting situation of the pixels corresponding to the slit electrode 300 in the liquid crystal display panel under the driving voltage of 4V when the value of the gradual angle is 1°. FIG. 18 shows the lighting situation of the pixels corresponding to the slit electrode 300 in the liquid crystal display panel under the driving voltage of 4V when the value of the gradual angle is 2°. FIG. 19 shows the lighting situation of the pixels corresponding to the slit electrode 300 in the liquid crystal display panel under the driving voltage of 4V when the value of the gradual angle is 3°. It can be known from FIG. 17 to FIG. 19 that, under the drive of the driving voltage of 4V, an open side of the slit electrode 300 of the display panel corresponding to the slit electrode 300 with the gradual angle of 1° and 2° respectively starts to light up, but the open side of the slit electrode 300 of the display panel corresponding to the slit electrode 300 with the gradual angle of 3° is not lit up, which indicates that as the gradual angle of the slit electrode 300 increases, the intensity of electric field applied by the data lead to the open side of the slit electrode 300 is lower, and the data lead needs to load a higher driving voltage before the open side lights up.

For another example, in an implementation of the present disclosure, the slit electrode 300 includes the first strip-shaped sub-electrodes 340 and the second strip-shaped sub-electrodes 350. The first edges 3402 of respective first strip-shaped sub-electrodes 340 are parallel to each other and the second edges 3403 of respective first strip-shaped sub-electrodes 340 are parallel to each other. The first design reference sizes of respective first strip-shaped sub-electrodes 340 are the same, and the first design reference points 3406 of respective first strip-shaped sub-electrodes 340 are disposed at equal distance. In the first strip-shaped sub-electrodes 340 connected to the first connecting section 310, the width of the first strip-shaped sub-electrode 340 at the second design reference point is 3.6 micrometers. The width of the first strip-shaped sub-electrode 340 at the fifth design reference point is 2.3 micrometers. The distance between the axial lines 3401 of two adjacent first strip-shaped sub-electrodes 340 is 6.6 micrometers. The first auxiliary design lines 3404 of respective first strip-shaped sub-electrodes 340 and the first auxiliary design lines 3504 of respective second strip-shaped sub-electrodes 350 are symmetrically disposed, and the second auxiliary design lines 3405 of respective first strip-shaped sub-electrodes 340 and the second auxiliary design lines 3505 of respective second strip-shaped sub-electrodes 350 are symmetrically disposed.

Figure 20:
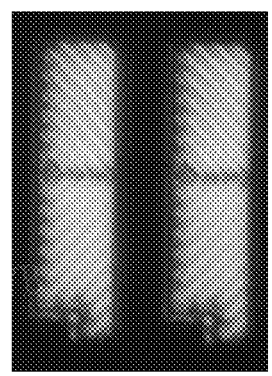
FIG. 20 shows the lighting situation of pixels corresponding to a slit electrode in a liquid crystal display panel when the width of a first strip-shaped sub-electrode and the width of a second strip-shaped sub-electrode gradually change in an implementation of the present disclosure.
Figure 21:
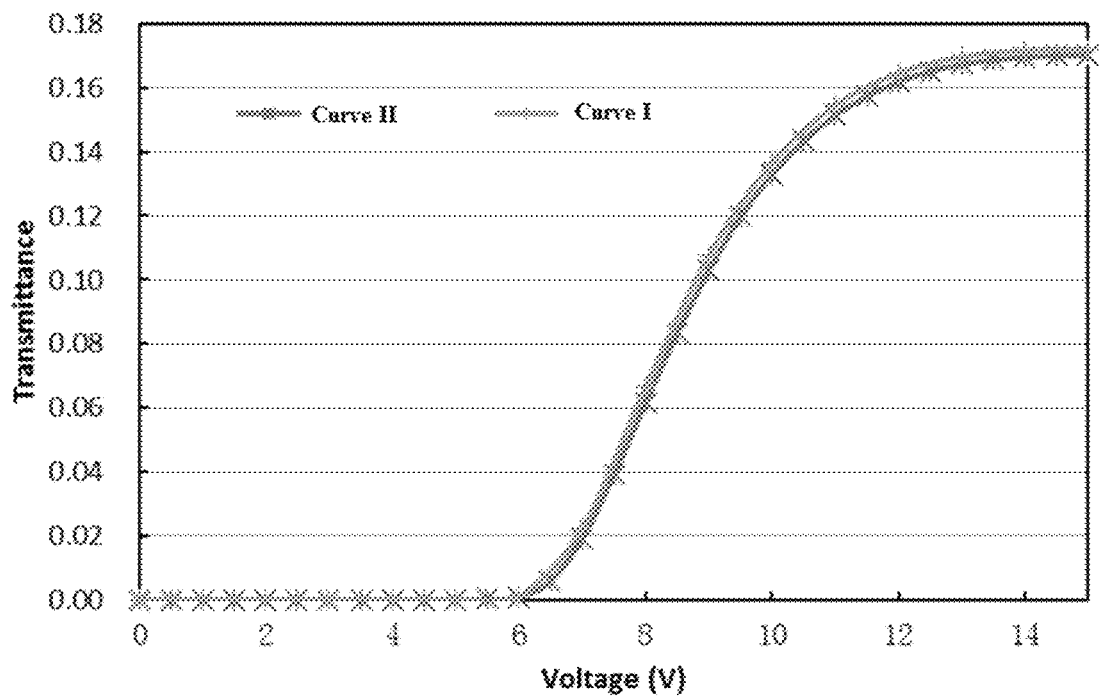
FIG. 21 shows the distribution of light transmittance of a liquid crystal display panel under different driving voltages when the width of the first strip-shaped sub-electrode and the width of the second strip-shaped sub-electrode gradually change.
Figure 22:
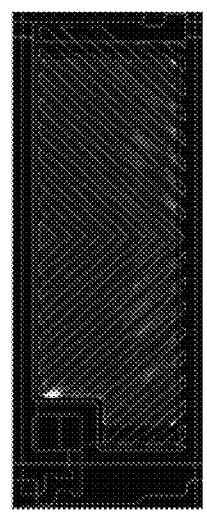
FIG. 22 shows the lighting situation of pixels corresponding to a slit electrode in a liquid crystal display panel under a driving voltage of 4V when the width of a first strip-shaped sub-electrode and the width of a second strip-shaped sub-electrode gradually change in an implementation of the present disclosure.

The photo of the display panel to which the slit electrode 300 is applied in the lighting state is as shown in FIG. 20. Referring to FIG. 20, when the slit electrode 300 is applied to the display panel, no disclination occurs on the display panel. The relationship between the light transmittance of the display panel and the driving voltage is as shown by curve I in FIG. 21. FIG. 22 shows the lighting situation of the pixels corresponding to the slit electrode 300 in the liquid crystal display panel under a driving voltage of 4V. Referring to FIG. 22, under the driving voltage of 4V, the open side of the slit electrode 300 is not lit up, which indicates that the slit electrode 300 can effectively reduce the intensity of the electric field between the open side thereof and the data lead.

For another example, in an implementation of the present disclosure, the slit electrode 300 includes the first strip-shaped sub-electrodes 340 and the second strip-shaped sub-electrodes 350. The axial lines 3401 of respective first strip-shaped sub-electrodes 340 are parallel to each other, and the distance between the axial lines 3401 of two adjacent first strip-shaped sub-electrodes 340 is 6.6 micrometers. In the first strip-shaped sub-electrodes 340 connected to the first connecting section 310, the width of the first strip-shaped sub-electrode 340 at the second design reference point is 3.6 micrometers, and the width of the first strip-shaped sub-electrode 340 at the fifth design reference point is 2.3 micrometers. In the first strip-shaped sub-electrodes 340 connected to the second connecting section 320, the width of the first strip-shaped sub-electrode 340 at the third design reference point is 3.6 micrometers, and the width of the first strip-shaped sub-electrode 340 at the fifth design reference point is 2.3 micrometers. The first auxiliary design lines 3404 of respective first strip-shaped sub-electrodes 340 and the first auxiliary design lines 3504 of respective second strip-shaped sub-electrodes 350 are symmetrically disposed. The second auxiliary design lines 3405 of respective first strip-shaped sub-electrodes 340 and the second auxiliary design lines 3505 of respective second strip-shaped sub-electrodes 350 are symmetrically disposed.

Figure 23:
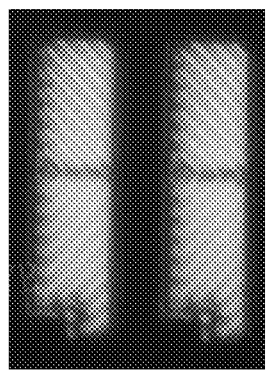
FIG. 23 shows the lighting situation of pixels corresponding to a slit electrode in a liquid crystal display panel when the width of a first strip-shaped sub-electrode and the width of a second strip-shaped sub-electrode gradually change in an implementation of the present disclosure.
Figure 24:
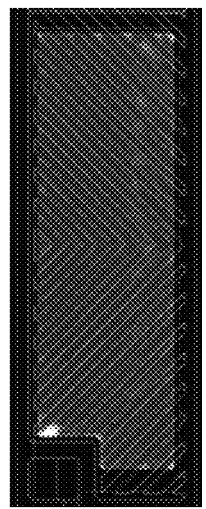
FIG. 24 shows the lighting situation of pixels corresponding to a slit electrode in a liquid crystal display panel under a driving voltage of 4V when the width of a first strip-shaped sub-electrode and the width of a second strip-shaped sub-electrode gradually change in an implementation of the present disclosure.

The photo of the display panel to which the slit electrode 300 is applied in a lighting state is as shown in FIG. 23. Referring to FIG. 23, when the slit electrode 300 is applied to the display panel, no disclination occurs on the display panel. The relationship between the light transmittance of the display panel and the driving voltage is as shown in curve II in FIG. 21. FIG. 24 shows the lighting situation of the pixels corresponding to the slit electrode 300 in the liquid crystal display panel under a driving voltage of 4V. Referring to FIG. 24, under the driving voltage of 4V, the open side of the slit electrode 300 is not lit up, which indicates that the slit electrode 300 can effectively reduce the intensity of the electric field between the open side and the data lead.

In summary, the present disclosure provides an array substrate. In the array substrate, the distance between the first strip-shaped sub-electrodes is larger on the side away from the first connecting section, such that the intensity of the electric field between the side of the slit electrode away from the first connecting section and the data lead is further reduced. Therefore, according to the present disclosure, the difference in the intensities of the electric fields between two sides of the slit electrode and the data leads increases by gradually changing the distance between the first strip-shaped sub-electrodes, thereby reducing or eliminating the disclination, and improving the light extraction efficiency of the display panel adopting the array substrate.

Figure 25:
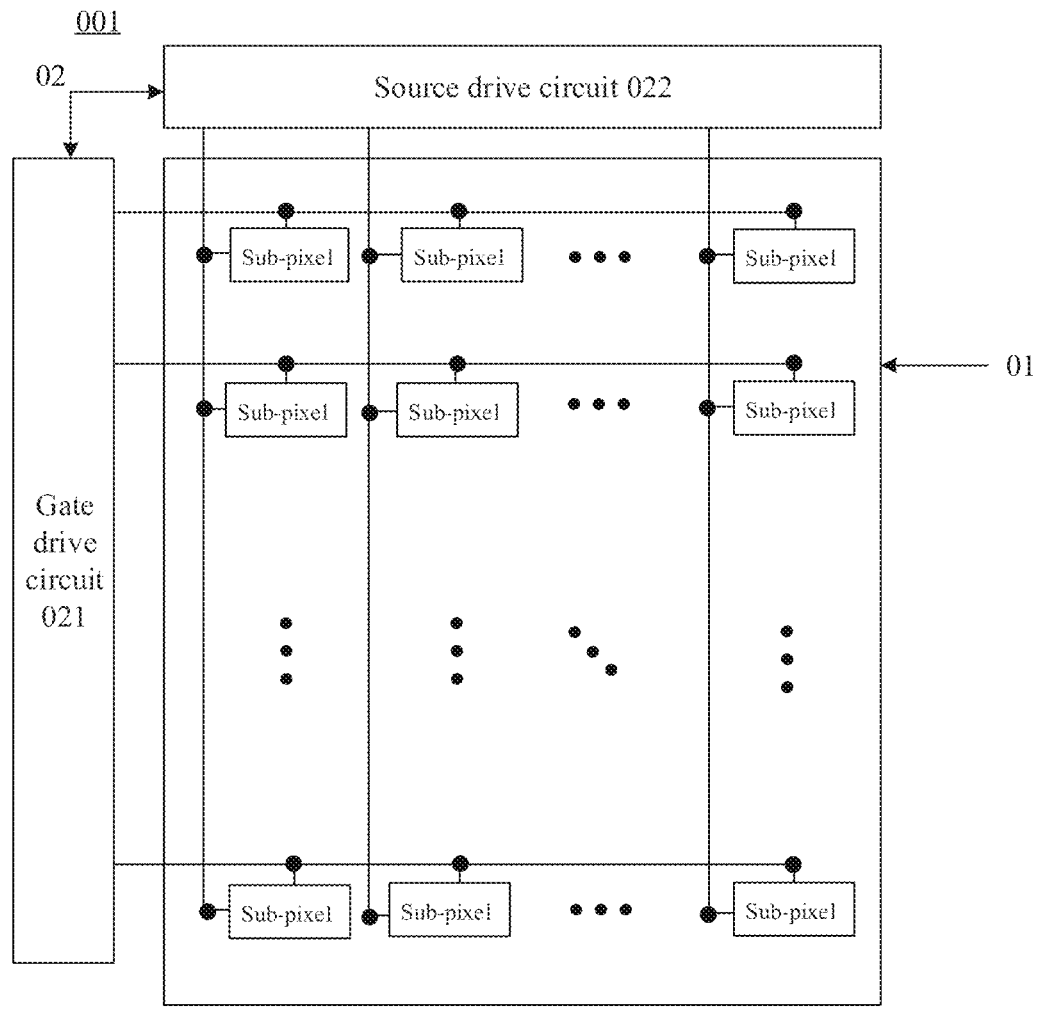
FIG. 25 is a schematic structural diagram of a display panel in an implementation of the present disclosure.

FIG. 25 is a schematic structural diagram of a display panel in an implementation of the present disclosure. It can be known with reference to FIG. 25 that the display panel 001 may include a drive circuit 02 and an array substrate 01. The drive circuit 02 may be connected to the array substrate 01 and is configured to provide a driving signal for the array substrate 01. For example, the drive circuit 02 is configured to provide driving signals for sub-pixels in the array substrate 01.

Referring to FIG. 25, the drive circuit 02 may include a gate drive circuit 021 and a source drive circuit 022. The gate drive circuit 021 may be connected to each row of sub-pixels in the array substrate 01 through a scan lead 203, and is configured to provide a gate driving signal for each row of sub-pixels. The source drive circuit 202 may be connected to each column of sub-pixels in the array substrate 01 through a data lead 202 and is configured to provide a data signal for each column of sub-pixels.

The display panel may be a television panel, a mobile phone panel, a computer screen panel or other types of panels. The display panel may be a liquid crystal display panel. The liquid crystal display panel may include a color filter substrate and the array substrate according to the present disclosure, which are aligned, as well as a liquid crystal layer disposed between the color filter substrate and the array substrate.

Figure 26:
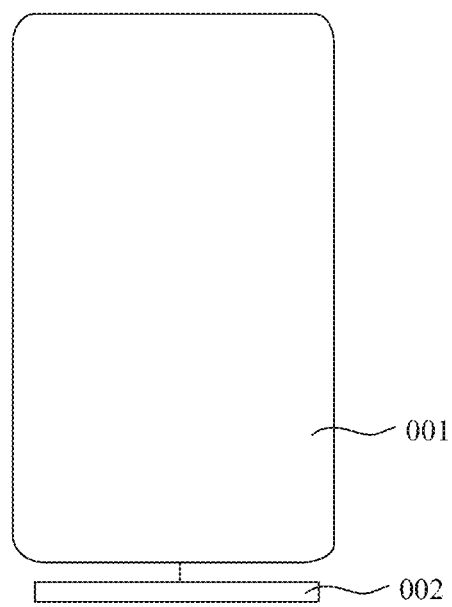
FIG. 26 is a schematic structural diagram of a display apparatus in an implementation of the present disclosure.

FIG. 26 is a schematic structural diagram of a display apparatus in an implementation of the present disclosure. Referring to FIG. 26, the display apparatus may include a power supply component 002 and a display panel 001. The power supply component 002 is connected to the display panel 001 and is configured to supply power to the display panel 001.

Optionally, the display apparatus may be any product or component with a display function and a fingerprint recognition function, such as a liquid crystal display apparatus, electronic paper, a mobile phone, a tablet computer, a television, a monitor, a notebook computer, a digital photo frame or a navigator. The display apparatus may be configured to display videos or static images, or the like.

In some implementations, liquid crystal in the liquid crystal layer of the display panel 001 of the display apparatus may be negative liquid crystal, and the negative liquid crystal may be arranged in a direction perpendicular to the array substrate without drive of an electric field. In this way, in the display apparatus with the display panel, when no driving voltage is loaded on the array substrate, there is almost no phase difference of the liquid crystal, which does not change the polarization state of linearly polarized light penetrating through a first polarizer, so that the display panel has better performance in dark state and has higher contrast.

It should be understood that the present disclosure is not limited to the detailed structure and arrangement of the components provided in the description, and may be implemented in various ways. The variations and modifications fall within the scope of the present disclosure. It should be understood that the present disclosure disclosed and defined in the description extends to all alternative combinations of two or more individual features mentioned or obvious in the description and/or the accompanying drawings. All these different combinations form multiple alternative aspects of the present disclosure. The implementations of the present description illustrate the best known ways for implementing the present disclosure, and enable those skilled in the art to utilize the present disclosure.

What is claimed is:

1. An array substrate, comprising a base substrate, a first electrode layer, an insulating dielectric layer, and a second electrode layer which are laminated in sequence; wherein the array substrate further comprises a plurality of data leads; and one of the first electrode layer and the second electrode layer comprises at least one slit electrode;

the slit electrode is disposed between two adjacent data leads, and the slit electrode comprises an electrode connecting portion and a plurality of first strip-shaped sub-electrodes arranged in sequence, one end of each of the first strip-shaped sub-electrodes being connected to the electrode connecting portion; and the electrode connecting portion comprises a first connecting section parallel to and adjacent to the data lead, wherein the plurality of first strip-shaped sub-electrodes are disposed on a same side of the first connecting section; and a distance between two adjacent first strip-shaped sub-electrodes in a direction parallel to an extending direction of the first connecting section gradually increases along a direction going away from the first connecting section;

wherein for one slit electrode, the first connecting section comprises a first end and a second end that are opposite; the first strip-shaped sub-electrode extends from the first end towards a side close to the second end along the direction going away from the first connecting section; in two adjacent first strip-shaped sub-electrodes, an inclination angle of one of the first strip-shaped sub-electrodes close to the second end is smaller than an inclination angle of the other first strip-shaped sub-electrode close to the first end; wherein the inclination angle of each of the first strip-shaped sub-electrodes is an angle between an extending direction of the first strip-shaped sub-electrode and the extending direction of the first connecting section, and the inclination angle of each of the first strip-shaped sub-electrodes is an acute angle;

the electrode connecting portion further comprises a second connecting section, and a first end of the second connecting section is connected to the first end of the first connecting section; wherein one ends of part of the plurality of first strip-shaped sub-electrodes are connected to the first connecting section, and one ends of the other first strip-shaped sub-electrodes are connected to the second connecting section; and each of the first strip-shaped sub-electrodes has a first edge and a second edge which are opposite, and the first edge of the first strip-shaped sub-electrode is farther from a second end of the second connecting section than the second edge of the first strip-shaped sub-electrode is; and the first connecting section has a first edge and a second edge which are opposite to each other and are parallel to the extending direction of the first connecting section, and the second edge of the first connecting section is farther from the first strip-shaped sub-electrode than the first edge of the first connecting section is:

wherein in the plurality of first strip-shaped sub-electrodes connected to the first connecting section, a distance between first design reference points of any two adjacent first strip-shaped sub-electrodes is equal, wherein the first design reference point of the first strip-shaped sub-electrode is an intersection point of a first auxiliary design line of the first strip-shaped sub-electrode and an auxiliary design line of the first connecting section, wherein the first auxiliary design line of the first strip-shaped sub-electrode is a straight line on which an orthographic projection of the first edge of the first strip-shaped sub-electrode on the base substrate is located, and the auxiliary design line of the first connecting section is a straight line on which an orthographic projection of the first edge of the first connecting section on the base substrate is located.

2. The array substrate according to claim 1, wherein in two adjacent first strip-shaped sub-electrodes, the inclination angle of one of the first strip-shaped sub-electrodes close to the second end is smaller than the inclination angle of the other first strip-shaped sub-electrode close to the first end by 1° to 3°.

3. The array substrate according to claim 2, wherein in two adjacent first strip-shaped sub-electrodes, the inclination angle of one of the first strip-shaped sub-electrodes close to the second end is smaller than the inclination angle of the other first strip-shaped sub-electrode close to the first end by 1.5° to 2.5°.

4. The array substrate according to claim 1, wherein when the slit electrode comprises 2M+1 first strip-shaped sub-electrodes arranged in sequence, the inclination angle of an $(M+1)^{th}$ first strip-shaped sub-electrode is 45°, M being a positive integer greater than or equal to 1.

5. The array substrate according to claim 1, wherein when the slit electrode comprises 2M first strip-shaped sub-electrodes arranged in sequence, either the inclination angle of an $M^{th}$ first strip-shaped sub-electrode or the inclination angle of an $(M+1)^{th}$ first strip-shaped sub-electrode is 45°, M being a positive integer greater than or equal to 1.

6. The array substrate according to claim 1, wherein when the slit electrode comprises 2M first strip-shaped sub-electrodes arranged in sequence, an average value of the inclination angle of an $M^{th}$ first strip-shaped sub-electrode and the inclination angle of an $(M+1)^{th}$ first strip-shaped sub-electrode is 45°, M being a positive integer greater than or equal to 1.

7. The array substrate according to claim 1,
wherein in the plurality of first strip-shaped sub-electrodes connected to the second connecting section, a distance between the first design reference points of two adjacent first strip-shaped sub-electrodes decreases sequentially along a direction going away from the first end of the first connecting section.

8. The array substrate according to claim 1, wherein the slit electrode further comprises a plurality of second strip-shaped sub-electrodes arranged in sequence; one end of each of the second strip-shaped sub-electrodes is connected to the electrode connecting portion; the second strip-shaped sub-electrode extends from the second end of the first connecting section towards a side close to the first end of the first connecting section along the direction going away from the first connecting section;

in one slit electrode, the plurality of first strip-shaped sub-electrodes and the plurality of second strip-shaped sub-electrodes are disposed on a same side of the first connecting section; in two adjacent second strip-shaped sub-electrodes, an inclination angle of one of the second strip-shaped sub-electrodes close to the first end of the first connecting section is smaller than an inclination angle of the other second strip-shaped sub-electrode close to the second end of the first connecting section;

wherein the inclination angle of each of the second strip-shaped sub-electrodes is an angle between an extending direction of the second strip-shaped sub-electrode and the extending direction of the first connecting section, and the inclination angle of each of the second strip-shaped sub-electrodes is an acute angle.

9. The array substrate according to claim 8, wherein in two adjacent second strip-shaped sub-electrodes, the inclination angle of one of the second strip-shaped sub-electrodes close to the first end of the first connecting section is smaller than the inclination angle of the other second strip-shaped sub-electrode close to the second end of the first connecting section by 1° to 3°.

10. The array substrate according to claim 9, wherein in two adjacent second strip-shaped sub-electrodes, the inclination angle of one of the second strip-shaped sub-electrodes close to the first end of the first connecting section is smaller than the inclination angle of the other second strip-shaped sub-electrode close to the second end of the first connecting section by 1.5° to 2.5°.

11. The array substrate according to claim 8, wherein the electrode connecting portion further comprises a third connecting section, and a first end of the third connecting section is connected to the second end of the first connecting section;
wherein in one slit electrode, one ends of part of the plurality of the second strip-shaped sub-electrodes are connected to the first connecting section, and one ends of the other second strip-shaped sub-electrodes are connected to the third connecting section.

12. The array substrate according to claim 11, wherein in one slit electrode, electrode space is formed by the first connecting section, the second connecting section and the third connecting section, and the plurality of first strip-shaped sub-electrodes and the plurality of second strip-shaped sub-electrodes are disposed in the electrode space.

13. The array substrate according to claim 8, wherein the slit electrode comprises at least one strip-shaped sub-electrode group, and each strip-shaped sub-electrode group comprises one first strip-shaped sub-electrode and one second strip-shaped sub-electrode which are correspondingly disposed; and
in each strip-shaped sub-electrode group, an end of the first strip-shaped sub-electrode away from the first connecting section is connected to an end of the second strip-shaped sub-electrode away from the first connecting section.

14. The array substrate according to claim 13, wherein in one slit electrode, each strip-shaped sub-electrode group and the electrode connecting portion define enclosed space; and
in the enclosed space, a number of the first strip-shaped sub-electrodes is the same as a number of the second strip-shaped sub-electrodes.

15. The array substrate according to claim 8, wherein the electrode connecting portion further comprises a third connecting section, and a first end of the third connecting section is connected to the second end of the first connecting section; in one slit electrode, each of the first strip-shaped sub-electrodes has a first edge and a second edge which are opposite, and the first edge of the first strip-shaped sub-electrode is farther from a second end of the second connecting section than the second edge of the first strip-shaped sub-electrode is; each of the second strip-shaped sub-electrodes has a first edge and a second edge which are opposite, and the first edge of the second strip-shaped sub-electrode is farther from a second end of the third connecting section than the second edge of the second strip-shaped sub-electrode is;
wherein in one slit electrode, a number of the first strip-shaped sub-electrodes is the same as a number of the second strip-shaped sub-electrodes; first auxiliary design lines of the first strip-shaped sub-electrodes and first auxiliary design lines of the second strip-shaped sub-electrodes are disposed symmetrically;
the first auxiliary design line of the first strip-shaped sub-electrode is a straight line on which an orthographic projection of the first edge of the first strip-shaped sub-electrode on the base substrate is located; and the first auxiliary design line of the second strip-shaped sub-electrode is a straight line on which an orthographic projection of the first edge of the second strip-shaped sub-electrode on the base substrate is located.

16. A display panel, comprising a drive circuit and an array substrate, the drive circuit being configured to provide a driving signal for the array substrate; and the array substrate comprising a base substrate, a first electrode layer, an insulating dielectric layer, and a second electrode layer which are laminated in sequence; wherein the array substrate further comprises a plurality of data leads; one of the first electrode layer and the second electrode layer comprises at least one slit electrode;
the slit electrode is disposed between two adjacent data leads, and the slit electrode comprises an electrode connecting portion and a plurality of first strip-shaped sub-electrodes arranged in sequence; one end of each of the first strip-shaped sub-electrodes is connected to the electrode connecting portion; and
the electrode connecting portion comprises a first connecting section parallel to and adjacent to the data lead; the plurality of first strip-shaped sub-electrodes are disposed on a same side of the first connecting section; and a distance between two adjacent first strip-shaped sub-electrodes in a direction parallel to an extending direction of the first connecting section gradually increases along a direction going away from the first connecting section;
wherein for one slit electrode, the first connecting section comprises a first end and a second end that are opposite; the first strip-shaped sub-electrode extends from the first end towards a side close to the second end along the direction going away from the first connecting section; in two adjacent first strip-shaped sub-electrodes, an inclination angle of one of the first strip-shaped sub-electrodes close to the second end is smaller than an inclination angle of the other first strip-shaped sub-electrode close to the first end; wherein the inclination angle of each of the first strip-shaped sub-electrodes is an angle between an extending direction of the first strip-shaped sub-electrode and the extending direction of the first connecting section, and the inclination angle of each of the first strip-shaped sub-electrodes is an acute angle;
the electrode connecting portion further comprises a second connecting section, and a first end of the second connecting section is connected to the first end of the first connecting section; wherein one ends of part of the plurality of first strip-shaped sub-electrodes are connected to the first connecting section, and one ends of the other first strip-shaped sub-electrodes are connected to the second connecting section; and
each of the first strip-shaped sub-electrodes has a first edge and a second edge which are opposite, and the first edge of the first strip-shaped sub-electrode is farther from a second end of the second connecting section than the second edge of the first strip-shaped sub-electrode is; and the first connecting section has a first edge and a second edge which are opposite to each other and are parallel to the extending direction of the first connecting section, and the second edge of the first connecting section is farther from the first strip-shaped sub-electrode than the first edge of the first connecting section is;

wherein in the plurality of first strip-shaped sub-electrodes connected to the first connecting section, a distance between first design reference points of any two adjacent first strip-shaped sub-electrodes is equal, wherein the first design reference point of the first strip-shaped sub-electrode is an intersection point of a first auxiliary design line of the first strip-shaped sub-electrode and an auxiliary design line of the first connecting section, wherein the first auxiliary design line of the first strip-shaped sub-electrode is a straight line on which an orthographic projection of the first edge of the first strip-shaped sub-electrode on the base substrate is located, and the auxiliary design line of the first connecting section is a straight line on which an orthographic projection of the first edge of the first connecting section on the base substrate is located.

17. A display apparatus, comprising: a power supply component and a display panel; wherein the power supply component is configured to supply power to the display panel; and the display panel comprises a drive circuit and an array substrate, the drive circuit being configured to provide a driving signal for the array substrate; and the array substrate comprising a base substrate, a first electrode layer, an insulating dielectric layer, and a second electrode layer which are laminated in sequence; wherein the array substrate further comprises a plurality of data leads; one of the first electrode layer and the second electrode layer comprises at least one slit electrode;

the slit electrode is disposed between two adjacent data leads, and the slit electrode comprises an electrode connecting portion and a plurality of first strip-shaped sub-electrodes arranged in sequence; one end of each of the first strip-shaped sub-electrodes is connected to the electrode connecting portion; and the electrode connecting portion comprises a first connecting section parallel to and adjacent to the data lead; the plurality of first strip-shaped sub-electrodes are disposed on a same side of the first connecting section; and a distance between two adjacent first strip-shaped sub-electrodes in a direction parallel to an extending direction of the first connecting section gradually increases along a direction going away from the first connecting section;

wherein for one slit electrode, the first connecting section comprises a first end and a second end that are opposite; the first strip-shaped sub-electrode extends from the first end towards a side close to the second end along the direction going away from the first connecting section; in two adjacent first strip-shaped sub-electrodes, an inclination angle of one of the first strip-shaped sub-electrodes close to the second end is smaller than an inclination angle of the other first strip-shaped sub-electrode close to the first end; wherein the inclination angle of each of the first strip-shaped sub-electrodes is an angle between an extending direction of the first strip-shaped sub-electrode and the extending direction of the first connecting section, and the inclination angle of each of the first strip-shaped sub-electrodes is an acute angle;

the electrode connecting portion further comprises a second connecting section, and a first end of the second connecting section is connected to the first end of the first connecting section; wherein one ends of part of the plurality of first strip-shaped sub-electrodes are connected to the first connecting section, and one ends of the other first strip-shaped sub-electrodes are connected to the second connecting section; and each of the first strip-shaped sub-electrodes has a first edge and a second edge which are opposite, and the first edge of the first strip-shaped sub-electrode is farther from a second end of the second connecting section than the second edge of the first strip-shaped sub-electrode is; and the first connecting section has a first edge and a second edge which are opposite to each other and are parallel to the extending direction of the first connecting section, and the second edge of the first connecting section is farther from the first strip-shaped sub-electrode than the first edge of the first connecting section is;

wherein in the plurality of first strip-shaped sub-electrodes connected to the first connecting section, a distance between first design reference points of any two adjacent first strip-shaped sub-electrodes is equal, wherein the first design reference point of the first strip-shaped sub-electrode is an intersection point of a first auxiliary design line of the first strip-shaped sub-electrode and an auxiliary design line of the first connecting section, wherein the first auxiliary design line of the first strip-shaped sub-electrode is a straight line on which an orthographic projection of the first edge of the first strip-shaped sub-electrode on the base substrate is located, and the auxiliary design line of the first connecting section is a straight line on which an orthographic projection of the first edge of the first connecting section on the base substrate is located.

\* \* \* \* \*